(12) United States Patent
Yao et al.

(10) Patent No.: US 9,322,272 B2
(45) Date of Patent: Apr. 26, 2016

(54) PLANETARY ROTARY TYPE FLUID MOTOR OR ENGINE AND COMPRESSOR OR PUMP

(75) Inventors: Qihuai Yao, Beijing (CN); Frank Yao, Beijing (CN)

(73) Assignee: BEIJING ROSTAR TECHNOLOGY CO. LTD, Beijing (CN)

( * ) Notice: Subject to any disclaimer, the term of this patent is extended or adjusted under 35 U.S.C. 154(b) by 0 days.

(21) Appl. No.: 13/703,202

(22) PCT Filed: May 31, 2011

(86) PCT No.: PCT/CN2011/075029
§ 371 (c)(1),
(2), (4) Date: Dec. 10, 2012

(87) PCT Pub. No.: WO2011/153915
PCT Pub. Date: Dec. 15, 2011

(65) Prior Publication Data
US 2013/0089447 A1    Apr. 11, 2013

(30) Foreign Application Priority Data
Jun. 10, 2010  (CN) .......................... 2010 1 0196950

(51) Int. Cl.
*F01C 1/02* (2006.01)
*F01C 1/26* (2006.01)
(Continued)

(52) U.S. Cl.
CPC ... *F01C 1/26* (2013.01); *F01C 1/00* (2013.01); *F01C 1/07* (2013.01); *F01C 1/10* (2013.01);
(Continued)

(58) Field of Classification Search
CPC ............... F01C 1/26; F01C 1/46; F01C 1/00; F01C 1/36; F01C 1/07; F01C 1/3447; F01C 1/10; F01C 1/3445; F04C 2/46; F02B 53/00; Y02T 10/17; F03C 2/00; F03C 2/02

USPC .............. 60/39.6–39.63; 123/242, 241, 18 R, 123/43 R; 418/54, 15, 33, 35, 36, 37, 225, 418/227, 38, 260
See application file for complete search history.

(56) References Cited

U.S. PATENT DOCUMENTS 2,938,505 A * 5/1960 Quartier ........................ 123/222
3,641,985 A * 2/1972 La Forge ....................... 123/241
(Continued)

FOREIGN PATENT DOCUMENTS

CN 2388350 7/2000
CN 2402833 10/2000
(Continued)

OTHER PUBLICATIONS

English Language Machine Translation of CN101864991.*
(Continued)

*Primary Examiner* — Mary A Davis
*Assistant Examiner* — Wesley Harris
(74) *Attorney, Agent, or Firm* — Hanley, Flight & Zimmerman, LLC

(57) ABSTRACT

A planetary rotary type rotation device comprises a stator, a rotor, and a center sun wheel drum (10). The stator includes a hollow cylinder block (1) having a cylinder. The rotor includes a main shaft (3), planetary piston wheel fixation flanges (9), and a planetary piston wheel (8). The two planetary piston wheel fixation flanges (9) are symmetrically fixed to the main shaft (3). The center sun wheel drum (10) is disposed between the two planetary piston wheel fixation flanges (9) and fitted over the main shaft (3). An annular piston space (19) is formed between an outer circular surface of the center sun wheel drum (10) and a cylinder wall of the cylinder of the cylinder block (1). The planetary piston wheel (8) is a cylindrical roller. The cylindrical roller is disposed in the annular piston space (19) in a rolling manner. Both ends of the cylindrical roller are fixed to the planetary piston wheel fixation flanges (9). A planetary rotary type fluid motor or engine, their operation method, and a planetary rotary type compressor or pump are disclosed. The planetary rotary type rotation device has a simple structure, a small volume, and a light weight.

20 Claims, 15 Drawing Sheets

(51) Int. Cl.
*F01C 1/46* (2006.01)
*F01C 1/00* (2006.01)
*F01C 1/36* (2006.01)
*F01C 1/07* (2006.01)
*F01C 1/344* (2006.01)
*F01C 1/10* (2006.01)
*F04C 2/46* (2006.01)
*F02B 53/00* (2006.01)
*F03C 2/00* (2006.01)
*F03C 2/02* (2006.01)

(52) U.S. Cl.
CPC ............ *F01C 1/3445* (2013.01); *F01C 1/3447* (2013.01); *F01C 1/36* (2013.01); *F01C 1/46* (2013.01); *F02B 53/00* (2013.01); *F03C 2/00* (2013.01); *F03C 2/02* (2013.01); *F04C 2/46* (2013.01); *Y02T 10/17* (2013.01)

(56) References Cited

U.S. PATENT DOCUMENTS

| | | | | |
|---|---|---|---|---|
| 4,137,891 | A | * | 2/1979 | Dalrymple .................... 123/245 |
| 4,332,534 | A | | 6/1982 | Becker |
| 4,370,111 | A | * | 1/1983 | Shea ............................ 418/212 |
| 4,741,308 | A | * | 5/1988 | Ballinger ..................... 123/231 |
| 5,609,479 | A | | 3/1997 | Yoshida |
| 6,468,045 | B1 | | 10/2002 | Yun |
| 2006/0032476 | A1 | * | 2/2006 | Bowley .................... F01C 1/36 123/228 |

FOREIGN PATENT DOCUMENTS

| | | |
|---|---|---|
| CN | 1276037 | 12/2000 |
| CN | 1442602 | 9/2003 |
| CN | 1482362 | 3/2004 |
| CN | 101054974 | 10/2007 |
| CN | 101113734 | 1/2008 |
| CN | 101864991 | 10/2010 |
| CN | 202125301 | 1/2012 |
| CN | 202125399 | 1/2012 |
| CN | 202152691 | 2/2012 |
| CN | 202152730 | 2/2012 |
| DE | 202005013321 | 11/2005 |
| DE | 102008015031 | 9/2009 |
| FR | 981992 | 6/1951 |
| GB | 1269705 | 4/1972 |
| JP | 59231138 | 12/1984 |
| RU | 2099588 | 12/1997 |

OTHER PUBLICATIONS

English Language Machine Translation of FR981992, published Jun. 1, 1951.*

Patent Cooperation Treaty, International Search Report issued in International Application No. PCT/CN2011/075029, mailed Sep. 15, 2011, 5 pages.

Japanese Patent Office, "First Office Action," issued in connection with Japanese Patent Application No. 2013-513532, Mar. 4, 2014, 5 pages.

The State Intellectual Property Office of the People's Republic of China, English Translation of "The First Office Action", issued in connection with Chinese Application No. 201010196950.8, Jun. 21, 2011, 1 page.

The State Intellectual Property Office of the People's Republic of China, English Translation of "The First Office Action", issued in connection with Chinese Application No. 201110154298.8, Sep. 26, 2012, 3 pages.

The State Intellectual Property Office of the People's Republic of China, English Translation of "The Second Office Action", issued in connection with Chinese Application No. 201110154298.8, Apr. 18, 2013, 5 pages.

The State Intellectual Property Office of the People's Republic of China, English Translation of "The First Office Action", issued in connection with Chinese Application No. 201110154371.1, Jul. 2, 2013, 4 pages.

The State Intellectual Property Office of the People's Republic of China, English Translation of "The First Office Action", issued in connection with Chinese Application No. 201110154415.0, Oct. 10, 2012, 8 pages.

The State Intellectual Property Office of the People's Republic of China, English Translation of "The Second Office Action", issued in connection with Chinese Application No. 201110154415.0, Mar. 22, 2013, 10 pages.

The State Intellectual Property Office of the People's Republic of China, English Translation of "Rejection", issued in connection with Chinese Application No. 201110154415.0, Jun. 4, 2013, 12 pages.

The State Intellectual Property Office of the People's Republic of China, English Translation of "The First Office Action", issued in connection with Chinese Application No. 201110154437.7, May 22, 2013, 9 pages.

The State Intellectual Property Office of the People's Republic of China, English Translation of "The Second Office Action", issued in connection with Chinese Application No. 201110154437.7, Nov. 14, 2013, 1 page.

* cited by examiner

PLANETARY ROTARY TYPE FLUID MOTOR OR ENGINE AND COMPRESSOR OR PUMP

BACKGROUND OF THE INVENTION

1. Field of the Invention

The present invention relates to a planetary rotary type fluid motor or engine and compressor and pump in which a main shaft is driven to rotate by driving a planetary piston wheel, disposed around the main shaft, to rotate, thereby transmitting power. The present invention adopts rolling friction. The present invention has the following characteristics, such as a simplified structure, higher efficiency, and more uniform and stabilized output power, compared with a compressor and a pump that utilize sliding friction, or a conventional reciprocating piston stroke engine, triangular-rotor engine and gas turbine 2. Description of the Related Art There are plunger, vane, gear, screw and scroll mechanical structures in the conventional field of the compressor and the pump, and there are the reciprocating piston four-stroke engine, the triangular-rotor engine, and the gas turbine in the conventional field of the engine. While using these mechanical structures, people continually improve and innovate them for the main purposes of:

1. trying to reduce fluid leakage and improve tightness as the fluid machinery;

2. trying to adopt rolling friction rather than sliding friction in a kinematic friction pair bearing a load in addition to putting in time and effort on wear resistance and de-abrasion of components, especially for mechanical design of main components, in order to reduce mechanical wear and energy consumption;

3. adopting symmetrical balanced mechanical structural design, and utilizing the most basic and simple geometrical elements such as concentric circles and planes to conceive of mechanical design of the main components, so that such design are not only good in resistance to external forces and deformation and in maintenance of accuracy, but also it facilitates on-site manufacture since it conforms to principles of precision machine technology;

4. hoping that the power output from it is stable and adjustable as a motor or an engine, and hoping that all of a pressure, a flow rate, and a temperature of fluid discharged from it meet the required standards and are adjustable as a compressor and a pump for compressing or pumping fluid; and 5. causing these mechanical structures to have a small volume, a light weight, a large output power, a high efficiency, low energy consumption, a long lifetime, low noise, low vibration, and low cost; to be durable, easy to adjust, and convenient for maintenance and repair; and to conform to requirement of environmental protection, as a result of a good concept of fluid machinery.

The reciprocating piston engine is a sliding friction structure. The engine itself comprises mechanical parts such as a timing belt, a cam shaft, a rocker arm, a valve, and a valve spring. The engine body is huge and complex, and the piston movement itself is a source of vibration, while a valve mechanism will generate boring mechanical noise. In particular, all of output torque characteristic curves of the four-stroke engine have a shape of a pulse wave and all of the four-stroke engines have the so-called "dead point". It is necessary to apply a force on a main shaft with a starter during starting of the engine. Most of external shapes of the components of the engine have complex curves so that it is not easy to manufacture the components, and the manufacturing cost is high.

Since there is only a radial seal sheet between adjacent chambers of the triangular-rotor engine, the radial seal sheet is always in linear contact with a cylinder block, and a position of the radial seal sheet in contact with the cylinder block always changes, three combustion chambers are not completely isolated (sealed) and the radial seal sheet will wear quickly. In addition, after the engine has been used for a period of time, a problem of gas leakage will be caused due to wear of material of an oil seal, thus considerably increasing fuel consumption and pollution. In addition, it is also difficult to maintain and repair this type of engine due to its unique mechanical structure.

SUMMARY OF THE INVENTION (a) Technical Problem to be Solved

It is an object of the present invention to provide a technical solution of a planetary rotary type fluid motor or engine and compressor and pump in which a main shaft is driven to rotate by a planetary piston wheel rotating around a main shaft, thereby transmitting power. The present invention adopts a structural form of rolling friction rather than a structural form of sliding friction. The present invention has the following characteristics, such as a simplified structure, higher efficiency, and more uniform and stabilized output power, compared with a conventional compressor or pump, reciprocating piston four-stroke engine and triangular-rotor engine, and gas turbine. (b) Technical solution A planetary rotary type rotation device according to the present invention comprises a stator, a rotor, and a center sun wheel drum; the stator includes a hollow cylinder block having a cylinder; the rotor includes a main shaft, planetary piston wheel fixation flanges, and a planetary piston wheel; the center sun wheel drum is disposed between the two planetary piston wheel fixation flanges and fitted over the main shaft; an annular piston space is formed between an outer circular surface of the center sun wheel drum and a cylinder wall of the cylinder of the cylinder block; the two planetary piston wheel fixation flanges are symmetrically fixed to the main shaft to seal both sides of the annular piston space; the planetary piston wheel is a cylindrical roller, the cylindrical roller is disposed in the annular piston space to seal piston spaces adjacent to the planetary piston wheel in rolling seal fit; and both ends of the cylindrical roller are fixed to the planetary piston wheel fixation flanges.

A planetary rotary type fluid motor or engine comprises a hollow cylinder block having a cylinder, and a main shaft supported by end covers on both sides of the cylinder block, sealing is performed between the cylinder block and the end covers, a planetary wheel rotation device is disposed around the main shaft to drive the main shaft to rotate, a groove is disposed in an inner surface of the cylinder of the cylinder block in an axial direction of the cylinder, a rotary valve sheet is mounted in the groove, a tail end of the rotary valve sheet is fixed in the groove by a rotary valve sheet supporting spindle, the rotary valve sheet supporting spindle is disposed parallel to an axial center line of the cylinder of the cylinder block, an end surface of a head of the rotary valve sheet is a circular arc surface, a through hole is disposed from a bottom surface of the groove to an outer surface of the cylinder block to serve as a power source input opening, and a through hole from the inner surface of the cylinder of the cylinder block to the outer surface of the cylinder block is disposed in the cylinder block to serve as a power source discharge opening; the planetary wheel rotation device comprises: planetary piston wheels, planetary piston wheel fixation flanges, and a center sun wheel drum; the planetary piston wheel is a cylindrical roller, both ends of the cylindrical roller are rotatably fixed to the planetary piston wheel fixation flanges, sealing is performed between the planetary piston wheel fixation flange and the cylinder block, the planetary piston wheel fixation flanges are fixed to the main shaft through keys, the center sun wheel drum is fitted over the main shaft to be disposed between the planetary piston wheels and the main shaft, an annular piston space in which the planetary piston wheels rotate is formed between an outer circular surface of the center sun wheel drum and a cylinder wall of the cylinder of the cylinder block, a number of the grooves of the cylinder block is at least two, and a number of the planetary piston wheels is at least three.

The planetary piston wheel is formed by rotatably fitting a roller barrel over a supporting shaft through a bearing, both ends of the supporting shaft are fixed to the planetary piston wheel fixation flanges, and the planetary piston wheel rolls snug against the cylinder wall of the cylinder block on the surface of the center sun wheel drum with both ends of the supporting shaft severing as supporting points.

The center sun wheel drum is fitted over the main shaft through a bearing.

Both ends of the rotary valve sheet supporting spindle are fixed to the end covers.

The two grooves are disposed to be separated from each other by an angle of 180 degrees, and the three planetary piston wheels are disposed to be separated from each other by an angle of 120 degrees.

A rotary valve sheet buffer terrace is disposed to snug against the planetary piston wheel on a reverse surface of the planetary piston wheel in a movement direction of the planetary piston wheel, and the rotary valve sheet buffer terrace is a rod-shaped block having an oblique surface.

Rotary valve sheet buffer terraces are disposed to snug against the planetary piston wheel forward of the planetary piston wheel and rearward of the planetary piston wheel, the rotary valve sheet buffer terraces are fixed to the planetary piston wheel fixation flanges, and the rotary valve sheet buffer terrace is a circular rod or a rod having an oblique surface.

An operation method of a planetary rotary type fluid motor or engine including the planetary rotary type fluid motor or engine according to the present invention comprises: injecting a pressurized gas or liquid from the power source input opening of the cylinder block into the groove of the cylinder block; driving the rotary valve sheet to perform downward fan-shaped swing along a side of the groove with the rotary valve sheet supporting spindle serving as a center, by the gas or liquid; pushing the planetary piston wheel to rotate forwards by the head of the rotary valve sheet, and then rushing the pressurized gas or liquid into the annular piston space to continue to push the planetary piston wheel to rotate forwards along the annular piston space; pressing the gas or liquid to be discharged from the power source discharge opening by the planetary piston wheel rotating forwards, and forming a gas or liquid pressure difference between the adjacent piston spaces separated by the rotary valve sheet after the rotary valve sheet swings downwards to the center sun wheel drum; and pressing the rotary valve sheet to swing upwards by the planetary piston wheel during the forward rotation of the planetary piston wheel, to reset the rotary valve sheet so that the rotary valve sheet enters a next reciprocating period.

A planetary rotary type compressor and pump according to the present invention comprises a hollow cylinder block having a cylinder, and a main shaft supported by end covers on both sides of the cylinder block, sealing is performed between the cylinder block and the end covers, a planetary wheel rotation device is disposed around the main shaft to be driven to rotate by the main shaft, a groove is disposed in an inner surface of the cylinder of the cylinder block in an axial direction of the cylinder, a rotary valve sheet is mounted in the groove, a tail end of the rotary valve sheet is fixed in the groove by a rotary valve sheet supporting spindle, the rotary valve sheet supporting spindle is disposed parallel to an axial center line of the cylinder of the cylinder block, an end surface of a head of the rotary valve sheet is a circular arc surface and slides in sealing contact with the groove to form a secondary compression chamber (a high pressure chamber); a through hole is disposed from a bottom surface of the groove to an outer surface of the cylinder block to serve as a pressure source output opening, and a through hole from an inner surface of the cylinder of the cylinder block to the outer surface of the cylinder block is disposed in the cylinder block to serve as a pressure source suction opening; the planetary wheel rotation device comprises: a planetary piston wheel, planetary piston wheel fixation flanges, and a center sun wheel drum; the planetary piston wheel is a cylindrical roller, a rotary valve sheet guide block is disposed to snug against the cylindrical roller on a forward end of the cylindrical roller in a movement direction of the cylindrical roller, both ends of the cylindrical roller are rotatably fixed to the planetary piston wheel fixation flanges, a rotary valve sheet resetting device is disposed between the rotary valve sheet and the cylinder block, the planetary piston wheel fixation flanges are fixed to the main shaft through keys, the center sun wheel drum is fitted over the main shaft to be disposed between the planetary piston wheel and the main shaft, an annular piston space in which the planetary piston wheel rotates in rolling seal fit is formed between an outer circular surface of the center sun wheel drum and a cylinder wall of the cylinder of the cylinder block, and the two planetary piston wheel fixation flanges are symmetrically fixed to the main shaft to seal both sides of the annular piston space.

The rotary valve sheet guide block is a block having an oblique surface, the oblique surface is a circular arc surface or a curve, and the rotary valve sheet guide block is supported and positioned by two spindles fixed to the planetary piston wheel fixation flanges.

The rotary valve sheet resetting device is a tension spring, and one end of the tension spring is locked to the rotary valve sheet supporting spindle by a crank, and another end of the tension spring is fixed to the cylinder block.

(c) Advantageous Technical Effect

The present invention has following contributions or advantages over the prior art.

1. Since a circular ring-shaped hydraulic (pneumatic) cylinder is adopted, an outer circumferential space of a machine is effectively utilized to its utmost extent. The machine is not only large in a radius, an output torque, and a flow rate, and constant in an output power, but also it is easy to additionally mount fins to the cylinder block or to employ a water cooling cylinder if heat is generated. Since the piston as the main component adopts a rolling manner, frictional wear of the piston and the cylinder is essentially greatly reduced so that sealing reliability is improved, and energy consumption is greatly decreased. The machine can have many varieties adapted to different circumstances from water to oil and gas, from a lower pressure to a high pressure, from a lower speed to a high speed, and from a micro type to superlarge type so as to have extremely wide market. The entire machine adopts symmetrical balanced mechanical structural design, assembly based on concentric circles is used as a keynote, and the machine has less components and a simple structure so as to facilitate on-site manufacture. In addition, the machine has a small volume and a light weight, adopts a great deal of standard parts of rolling bearings which are on the market and produced on a large scale. The machine has very low noise, no vibration, low cost, high accuracy, and a long lifetime, and is easy to maintain and repair.

2. When the planetary rotary type fluid motor is used as a new generation of fluid motors, it can be applied in a situation of low pressure fluid drive, such as low pressure drive using tap water, since the planetary rotary type fluid motor has a low frictional resistance of mechanical movement because of the rolling friction configuration proper to the planetary rotary type fluid motor. Due to annular cylinder configuration proper to the planetary rotary type fluid motor, the planetary rotary type fluid motor can be made as a large-diameter disk type planetary rotary fluid motor for use in a situation of a low-speed large-torque. For example, the planetary rotary type fluid motor may be used as a drive motive power machine of a low water head power plant. When the planetary rotary type fluid motor is used as a new generation of compressors, the planetary rotary type rotor compressor has a function of a secondary high-pressure compression chamber proper to the planetary rotary type rotor compressor in addition to the above advantages. Therefore, the planetary rotary type rotor compressor can be applied in a situation where a higher pressure is required, such as carbon dioxide compressors of a new generation of refrigerators, and vehicle-mounted air conditioners.

3. The planetary rotary type rotor engine has the following advantages. A. Small volume and light weight: the rotor engine has several advantages of which the most important one is to decrease a volume and a weight. The planetary rotary type rotor engine operates quietly and smoothly. On the premise of ensuring the same output power level, a design weight of the rotor engine is two-third of that of a reciprocating engine. The planetary rotary type rotor engine has lower energy consumption and little discharge. It is significant that the planetary rotary type rotor engine has high efficiency, a high output power, little discharge, and a low cost when countermeasure against the global warming and fossil fuel become less and less. B. Simplified structure: since the planetary rotary type rotor engine directly converts an expanding pressure generated by combustion of mixed gas of air and fuel to a rotational force for the main shaft of the planetary rotary type rotor engine, it is no longer necessary to dispose a crankshaft and a connecting rod and a gas inlet and a gas outlet are opened and closed by means of movement of the rotor itself. The planetary rotary type rotor engine no longer needs a gas distribution mechanism including a timing belt, a cam shaft, a rocker arm, a valve, a valve spring and the like which are an indispensable part in a reciprocating engine. Therefore, a number of component parts required by the planetary rotary type rotor engine is greatly reduced. C. Uniform torque characteristics: a characteristic curve of an output torque of the main shaft of the planetary rotary type rotor engine is always an ideal straight line when the engine is continuously supplied with a pressure fluid by continuous combustion. When the engine is supplied with a work pressure fluid by ignition and detonation, the planetary piston wheel does work by expansion of combustion gas. With movement of the planetary piston wheel, a volume of the high pressure annular cylinder is enlarged, a pressure of the high pressure combustion gas is continuously decreased, and an output torque of the engine is also reduced accordingly. In this case, a characteristic curve of an output torque of the main shaft of the planetary rotary type rotor engine becomes a uniform pulse curve with six wave crests in a range of 360 degrees, which corresponds to a characteristic curve of an output torque of a six-cylinder reciprocating piston four-stroke engine. However, all of characteristic curves of an output torque of the four-stroke engine of the conventional configuration have a shape of a pulse. D. Quiet operation and lower noise: for a reciprocating engine, piston movement itself is a source of vibration, while a valve mechanism will generate boring mechanical noise. Vibration generated by smooth rotational movement of the rotor engine is considerably low, and can operate more smoothly and more quietly because the rotor engine does not include valve mechanism. E. Reliability and durability: the biggest characteristic of configuration of the rotor of the planetary rotary type rotor engine is a complete rolling configuration and friction between the piston and the cylinder is completely seal rolling friction. The reliability and the durability of the planetary rotary type rotor engine is considerably higher than those of the four-stroke engine of the conventional configuration since friction between the piston and the cylinder of the four-stroke engine of the conventional configuration is sliding friction that is easy to cause wear and leakage. In addition, since the planetary rotary type rotor engine does not include those high-rotational speed moving parts such as a rocker arm and connecting rod, it is more reliable and more durable in high load movement. Since there is only a radial seal sheet between adjacent chambers of the Wankel triangular-rotor engine, the radial seal sheet will wear quickly. After the engine has been used for a period of time, a problem of gas leakage will be easily caused due to wear of material of an oil seal so as to considerably increase fuel consumption and pollution. In addition, it is difficult to maintain this type of engine due to its unique mechanical structure. However, the main shaft is directly driven to rotate by adopting the planetary piston wheel rolling seal of the present invention in the planetary rotary type rotor engine. Therefore, sealing structure is concise and antiwear. Apparently, the present invention can solve the above technical problem. The planetary rotary type rotor engine has the advantages such as a large output power, very low noise, low energy consumption, a long lifetime, a small volume, and a light weight, more stability, and significantly reduced vibration. Therefore, the planetary rotary type rotor engine can be widely used in diversified circumstances, such as a helicopter, a vehicle, and a ship. It is hopeful for the planetary rotary type rotor engine to become a new generation of high-efficiency, energy-saving, low-discharge internal combustion engines.

DETAILED DESCRIPTION OF THE EMBODIMENTS

The object, technical solutions and advantages of the present invention will be apparent and more readily appreciated from the following description of embodiments taken in conjunction with the accompanying drawings.

Embodiment 1

The first embodiment discloses a planetary rotary type rotation device.

Figure 1:
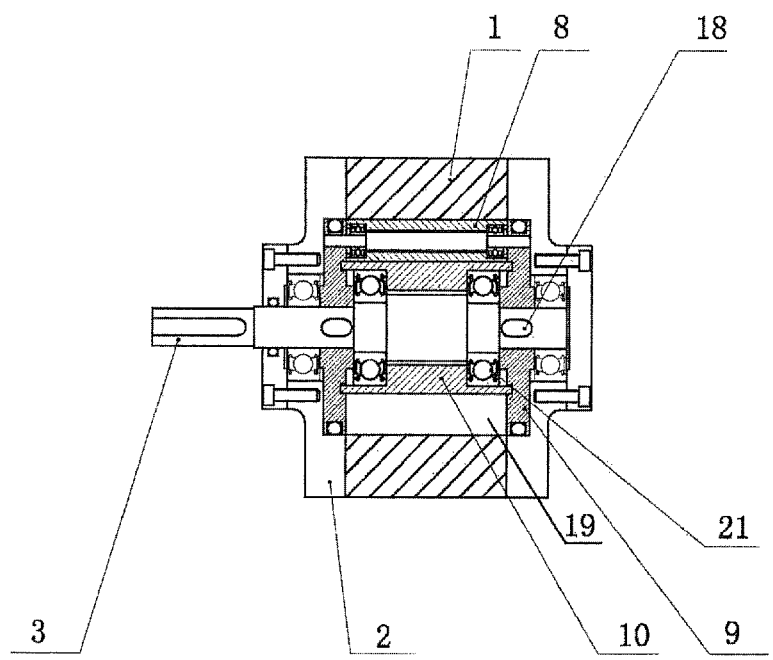
FIG. 1 is a schematic sectional side view of a structure of a planetary rotary type rotation device of the present invention.

Referring to FIG. 1, the planetary rotary type rotation device comprises a stator, a rotor, and a center sun wheel drum 10. The stator includes a hollow cylinder block 1 having a cylinder. The rotor includes a main shaft 3, planetary piston wheel fixation flanges 9, and a planetary piston wheel 8. The main shaft 3 is supported by end covers 2 on both sides of the cylinder block, and the two planetary piston wheel fixation flanges 9 are symmetrically fixed to the main shaft 3 through keys 18. The center sun wheel drum is disposed between the two planetary piston wheel fixation flanges and rotatably fitted over the main shaft through rolling bearings 21. An annular piston space 19 is formed between an outer circular surface of the center sun wheel drum and a cylinder wall of the cylinder of the cylinder block. The two planetary piston wheel fixation flanges are symmetrically fixed to the main shaft to seal both sides of the annular piston space. The planetary piston wheel is a cylindrical roller. The cylindrical roller is disposed in the annular piston space to seal piston spaces adjacent to the planetary piston wheel in a rolling seal fit. For example, a gap between the planetary piston wheel and each of both side walls is controlled within a range of 0.15 mm or less. Both ends of the cylindrical roller are fixed to the planetary piston wheel fixation flanges.

Embodiment 2

Figure 2:
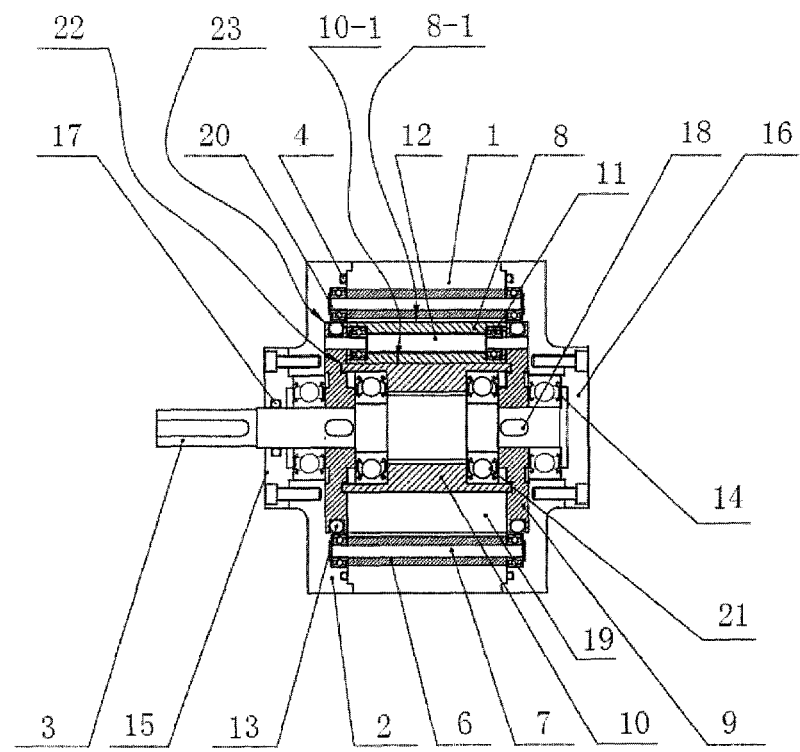
FIG. 2 is a schematic sectional side view of a structure of a fluid motor of the present invention.

The second embodiment discloses a planetary rotary type fluid motor or engine. Referring to FIGS. 1 and 2, the planetary rotary type fluid motor or engine comprises a hollow cylinder block 1 having a cylinder, and a main shaft 3 supported by end covers 2 on both sides of the cylinder block. Sealing is performed between the cylinder block and each of the end covers by a seal ring 4 to prevent fluid leakage. A planetary wheel rotation device is disposed around the main shaft to drive the main shaft to rotate. A surface of the cylinder of the cylinder block is a circular surface surrounding the main shaft. A groove 5 is disposed in the surface of the cylinder of the cylinder block in an axial direction of the cylinder. A rotary valve sheet 6 is mounted in the groove. A tail end of the rotary valve sheet is fixed to both end covers 2 by a rotary valve sheet supporting spindle 7. Alternatively the tail end of the rotary valve sheet may also be fixed to the cylinder block 1 by the rotary valve sheet supporting spindle 7. The rotary valve sheet supporting spindle is disposed parallel to an axial center line of the cylinder of the cylinder block. An end surface of a head of the rotary valve sheet is a circular arc surface 6-1. The rotary valve sheet performs fan-shaped swing along a longitudinal side 5-1 of the groove with the rotary valve sheet supporting spindle 7 serving as a center. During swing, the circular arc surface of the rotary valve sheet is in contact with the side of the groove. A through hole is disposed from a bottom surface of the groove to an outer surface of the cylinder block to serve as a power source input opening 1-1, and a through hole from the surface of the cylinder of the cylinder block to the outer surface of the cylinder block is disposed in the cylinder block on a side of the rotary valve sheet supporting spindle to serve as a power source discharge opening 1-2. The planetary wheel rotation device comprises: planetary piston wheels 8, planetary piston wheel fixation flanges 9, and a center sun wheel drum 10. The planetary piston wheel is a cylindrical roller, and the cylindrical roller is rotatably fixed to the planetary piston wheel fixation flanges. In the embodiment, the cylindrical roller is rotatably fitted over a supporting shaft 12 through bearings 11, and both ends of the supporting shaft 12 are fixed to the planetary piston wheel fixation flanges. Sealing is performed between the planetary piston wheel fixation flange and the cylinder block through a seal ring 13. The planetary piston wheel fixation flanges are fixed to the main shaft through keys 18. Since the planetary piston wheel fixation flanges are driven to rotate by rotating the planetary piston wheels, the main shaft is driven to rotate by rotating the planetary piston wheel fixation flanges. The center sun wheel drum is fitted over the main shaft to be disposed between the planetary piston wheels and the main shaft so that an annular piston space 19 in which the planetary piston wheels rotate is formed between a surface of the center sun wheel drum and the inner surface of the cylinder block.

As shown in FIG. 2, main shaft bearings 14 are mounted on the end covers 2 on both sides of the cylinder block, and a front bearing cover 15 and a rear bearing cover 16 close the end covers. A rubber seal ring 17 for movement is embedded in an inner hole of the front bearing cover 15 through which the main shaft 3 passes, to prevent fluid leakage. The end covers 2 on both sides of the cylinder block are fastened to the cylinder block 1 by means of screws.

In FIG. 2, the planetary piston wheel fixation flanges 9 are fastened to the main shaft 3 through the keys 18. Fit between the main shaft 3 and the planetary piston wheel fixation flanges 9 of the end covers 2 on both sides of the cylinder block employs sliding fit with inner circular surfaces of stepped holes of the planetary piston wheel fixation flanges 9. Rubber seal rings 13 for movement are mounted on outer circumferential end surfaces of the planetary piston wheel fixation flanges 9 to prevent fluid leakage between the end covers 2 and the annular piston space 19 in which the planetary piston wheels rotate. In the present embodiment, bearing positioning shims 20 are respectively fitted over three supporting shafts 12 mounted on the planetary piston wheel fixation flanges 9, to position the bearings. The supporting shafts serve as supporting points for the three planetary piston wheels 8 held on the rolling bearings. The planetary piston wheel snugging against the cylinder block 1 is a wall 8-1 of the cylindrical roller rolling on the surface 10-1 of the center sun wheel drum. The center sun wheel drum 10 fitted snug against the three planetary piston wheels are rotatably connected to the main shaft 3 through two rolling bearings 21 fitted over the main shaft. Fit of a contact surface 22 between the center sun wheel drum 10 and the planetary piston wheel fixation flange 9, and fit of a contact surface 23 between the planetary piston wheel fixation flange 9 and the end cover 2 is sliding fit and the gap therebetween is controlled within a range of 0.05 mm or less. Rubber seal rings also may be mounted to ensure tightness.

Figure 3:
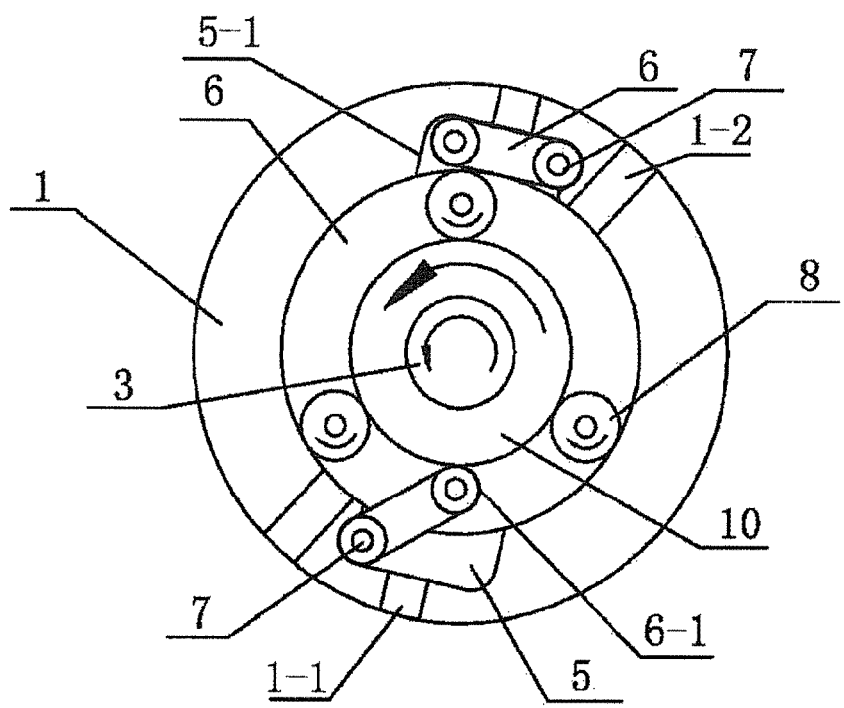
FIG. 3 is a schematic diagram showing rotational principles of main rotary elements of the fluid motor of the present invention.

As shown in FIG. 3, a number of the grooves of the cylinder block is at least two. The two grooves are disposed on the 360 degree circumferential surface of the cylinder of the cylinder block to be separated from each other by an angle of 180 degrees.

A number of the planetary piston wheels is at least three, and the three planetary piston wheels are disposed in the 360 degree annular piston space to be separated from each other by an angle of 120 degrees.

It shall be noted that the number of the groove may be three or four according to design requirements. The three grooves are disposed to be separated from each other by an angle of 120 degrees, while the four grooves are disposed to be separated from each other by an angle of 90 degrees. The number of the planetary piston wheels may be four or six. The four planetary piston wheels are disposed to be separated from each other by an angle of 90 degrees, while the six planetary piston wheels are disposed to be separated from each other by an angle of 60 degrees.

If the grooves are equidistantly separated from each other by 180 degrees, the annular space is divided into two variable volume working chambers when the two rotary valve sheets rotate into the annular space between the two planetary piston wheels. The two rotary valve sheets swing periodically with shafts serving as supporting points, while the shafts are fixed in the rotary valve sheet grooves of a the circular stator housing which is also used as an inner wall of the cylinder block. The planetary piston wheels sealed in the annular space can be driven to move by a difference between fluid pressures within the two working chambers. This is a first important function of the rotary valve sheet.

The three planetary piston wheels cyclically alternately pass swing critical intervals of the two rotary valve sheets once each time the main shaft rotates by 360 degrees. During the 360 degree rotation, one of the three planetary piston wheels is pushed by a fluid pressure to normally transmit a torque to the main shaft, one of the three planetary piston wheels approaches the rotary valve sheet that is normally snugged against the outer cylindrical surface of the center sun wheel, and the other planetary piston wheel is passing the rotary valve sheet that has been pushed away by it to retreat into the rotary valve sheet groove of the circular stator housing which is also used as the inner wall of the cylinder block, and has moved across the head of the rotary valve sheet. Therefore, the rotary valve sheet swings towards the working chamber under the fluid pressure to butt against the planetary piston wheel, thereby generating another amplified pushing force determined by a mechanical vector parallelogram of a contact point. Due to existence of this mechanical amplifying mechanism, the planetary piston wheel or a rotary valve sheet buffer terrace which approaches the rotary valve sheet that is normally snugged against the outer cylindrical surface of the center sun wheel, has a pushing force enough to push away the rotary valve sheet. As a result, the working chambers of the motor switches to operate cyclically and thus the motor can continuously rotate. This is a second important function of the rotary valve sheet.

An operation method of a planetary rotary type fluid motor or engine including the planetary rotary type fluid motor or engine comprises injecting a pressurized gas or liquid from the power source input opening of the cylinder block into the groove of the cylinder block; driving the rotary valve sheet to perform downward fan-shaped swing along a side of the groove with the rotary valve sheet supporting spindle serving as a center, by the gas or liquid; pushing the planetary piston wheel to rotate forwards by the head of the rotary valve sheet, and then rushing the pressurized gas or liquid into the annular piston space to continue to push the planetary piston wheel to rotate forwards along the annular piston space; pressing the gas or liquid to be discharged from the power source discharge opening by the planetary piston wheel rotating forwards, and forming a gas or liquid pressure difference between the adjacent piston spaces separated by the rotary valve sheet after the rotary valve sheet swings downwards to the center sun wheel drum; and pressing the rotary valve sheet to swing upwards by the planetary piston wheel during the forward rotation of the planetary piston wheel, to reset the rotary valve sheet so that the rotary valve sheet enters a next reciprocating period.

FIGS. 3-6 schematically show operational principles of the planetary rotary type fluid motor.

Figure 4:
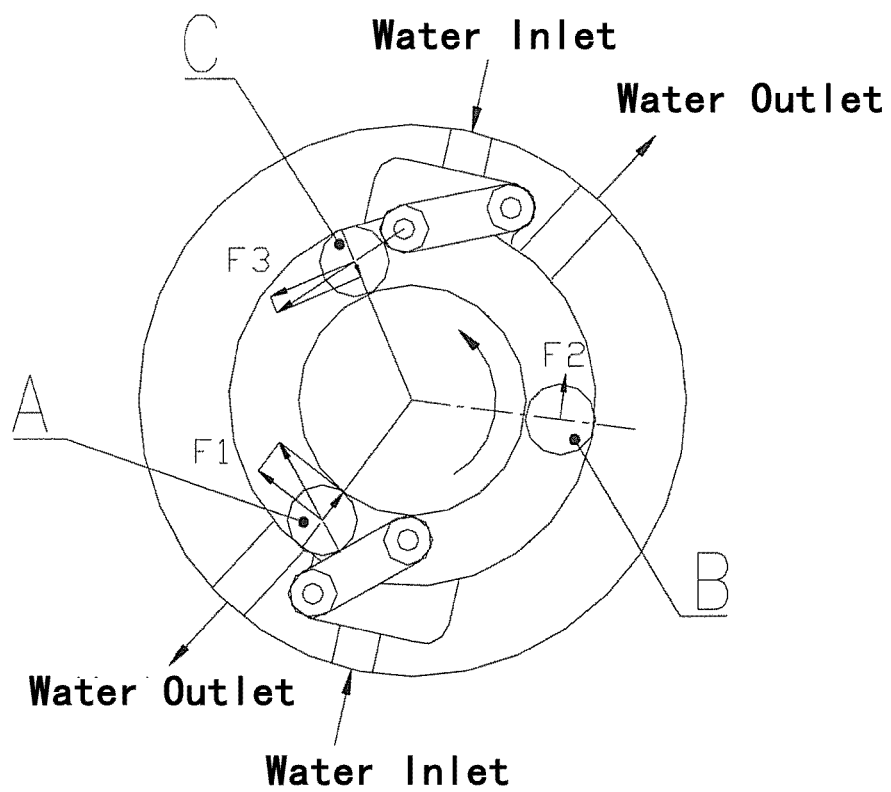
FIG. 4 is a vector analysis diagram of a parallelogram of mechanical action of a rotary valve sheet when a planetary piston wheel passes a critical point of a power source input opening.

FIG. 4 schematically shows a vector analysis diagram of a parallelogram of mechanical action of a contact point between a rotary valve sheet and a planetary piston wheel (abbreviated to planetary wheel) of a planetary piston wheel rotary valve sheet (abbreviated to planetary rotary type) hydraulic motor or prime mover when the planetary piston wheel passes a critical point of a liquid inlet. Mechanical action at every portion of such a mechanical mechanism is distributed strictly according to the mechanical theory. The so-called critical point of the liquid inlet means a swinging region of the rotary valve sheet 6. The planetary piston wheel A needs to overcome a resistance F1 when passing the critical point of the liquid inlet. It is apparently not enough to overcome the resistance F1 by only a force of the planetary piston wheel B that normally effectively operates at this time since F1>F2. In the mechanical mechanism shown in the figures, an actual measurement of the ratio of F1 to F2 is about 1.7. When the planetary piston wheel B passes an end of the critical point of the liquid inlet, sealing between the head of the rotary valve sheet and the planetary piston wheel C is always maintained. At the moment, the groove in which the rotary valve sheet of the liquid inlet is accommodated has become another high pressure hydraulic cylinder in the embodiment, but a hydraulic force generated by the high pressure hydraulic cylinder to push the planetary piston wheel C is not large. At this time, a mechanical force F3 generated by the rotary valve sheet 6 of the liquid inlet to push the planetary piston wheel C is very large. Their subtle mechanical combination of the wedge principle has a function of mechanical amplification. Therefore, in the embodiment shown in FIG. 3, F3 may exceed the resistance F1, received by the piston wheel A, by up to 1.1 times and is enough to push away the rotary valve sheet 6 obstructing the planetary piston wheel A so that the rotary valve sheet 6 advances. The hydraulic motor can enter the following cyclical action.

Figure 5:
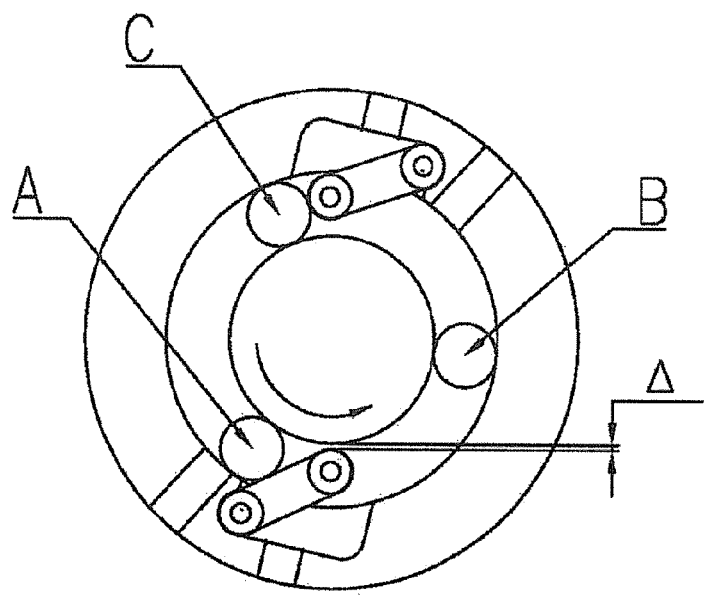
FIG. 5 is a schematic diagram showing action of the rotary valve sheet when the planetary piston wheel passes the critical point of the power source input opening.

Referring to FIG. 5, the rotary valve sheet 6 which obstructed the planetary piston wheel A has been pushed away, and an opening distance Δ of the head of the rotary valve sheet 6 from the outer circular surface of the center sun wheel drum will continuously enlarge. The annular hydraulic cylinders between the planetary piston wheel A and the planetary piston wheel B has communicated with each other. The operation of the planetary piston wheel B is stopped. At this time, the head of the rotary valve sheet and the planetary piston wheel C have entered a tangent position where the pushing force is maximal, and the planetary piston wheel C begin to normally effectively operate.

Figure 6:
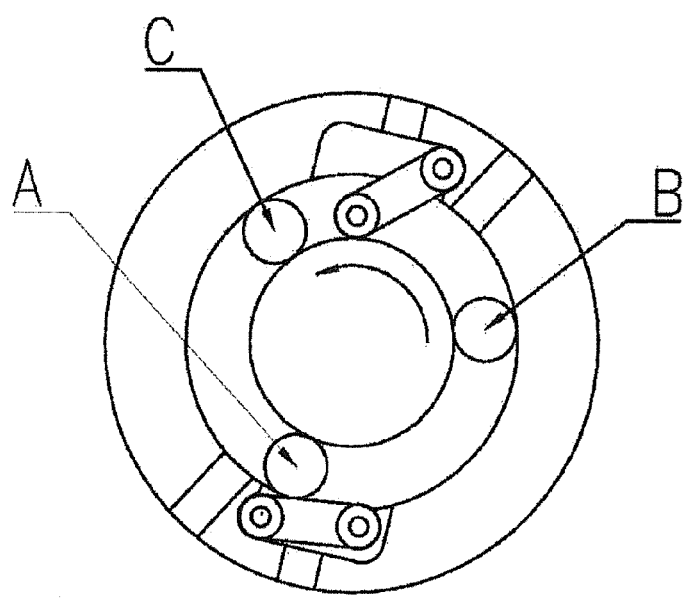
FIG. 6 is a schematic diagram showing action of the planetary piston wheel when the planetary piston wheel has passed the critical point of the power source input opening.

Referring to FIG. 6, the planetary piston wheel C has moved away from the swinging region of the rotary valve sheet 6 and normally operates. The annular cylinder between the planetary piston wheel C and the planetary piston wheel B is divided into a high pressure part and a low pressure part by the rotary valve sheet. The pressure difference between the high pressure part and the low pressure part drives the planetary piston wheel C to advance.

As shown in FIGS. 2 and 3, rotation directions of main rotary elements of the fluid motor according to the embodiment are indicated by arrows in FIG. 3. The planetary piston wheel 8 and the stator cylinder block 1 are first rotated by means of a seal friction force, and then the center sun wheel drum 10 is driven by the seal friction force with the planetary piston wheels 8. The three planetary piston wheels fixed to the planetary piston wheel fixation flanges 9 are alternately driven by pressurized fluid within the cylinder. The planetary piston wheel fixation flanges 9 fixed to the main shaft by means of the keys drive the main shaft to rotate.

Figure 7:
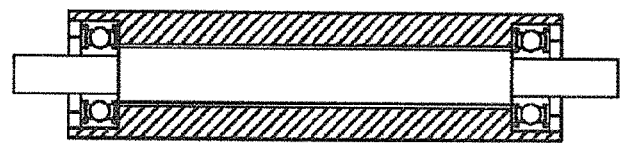
FIG. 7 is a schematic view of a structure of the planetary piston wheel.

The planetary piston wheel has four structural forms. As shown in FIG. 7, the planetary piston wheel is in a structural form of rolling bearings. The planetary piston wheel is formed by rotatably fitting a roller barrel over a supporting shaft through bearings. The rolling bearing may be balls, rollers or needles. In a particular environment, for example, in a situation where a diameter of the planetary piston wheel is too small, it is also possible to use slide bearings and sleeves which occupy less space rather than the rolling bearings. The planetary piston wheels formed by the rolling bearings and the slide bearings and sleeves have the same rolling mode. As a first form, the roller barrel is precision-machined with hard steel material like machining of rollers of a rolling bearing. As a second form, the roller barrel may be machined by a resilient engineering plastic and press-fitted in the hydraulic cylinder by an interference fit. During operation of the planetary piston wheel, the planetary piston wheel deforms while rolling so that the planetary piston wheel is in surface contact with the surface of the cylinder block and the center sun wheel drum to facilitate seal. As a third form, a surface of the roller barrel is coated with a layer of functional material, such as abrasion proof metal plating, elastic rubber, and engineering plastic. As a fourth form, firstly, the roller barrel machined by hard material is coated with a layer of elastic functional material, and then an elastic metal piston sleeve is fitted over the roller barrel. The roller barrel is press-fitted in the sealed chamber in which the planetary piston wheels rotate, by means of an interference fit. The elastic metal piston sleeve deforms while rolling so that the piston sleeve is in surface contact with the surface of the cylinder block and the center sun wheel drum to facilitate seal. In a high temperature and high pressure planetary rotary type rotor engine, a thin-wall elastic metal piston sleeve of refractory steel is directly fitted over an aluminum-alloy body of the planetary piston wheel with an appropriate gap between the sleeve and the body. The planetary piston wheel is interposed between the cylinder block and the center sun wheel drum. When planetary piston wheel rolls and advances, microcosmic elliptical elastic deformation is generated in the planetary piston wheel to facilitate seal.

Figure 8:
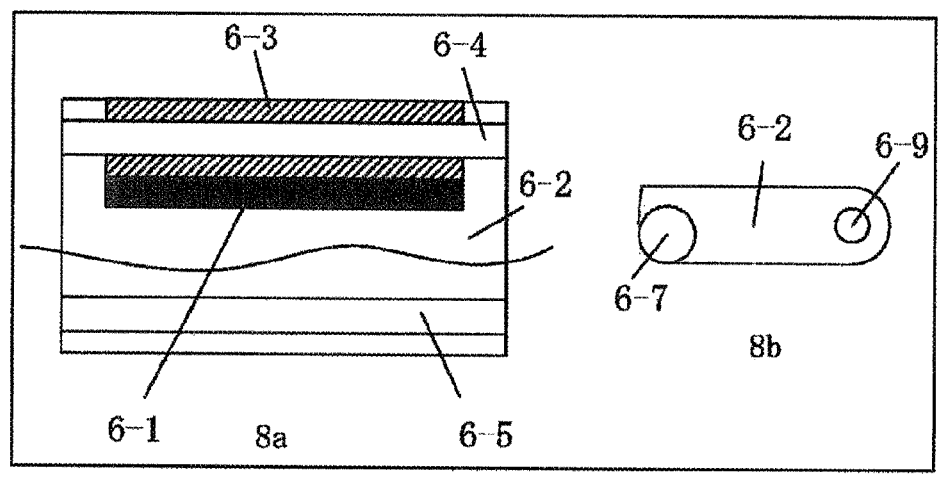
FIG. 8 is a schematic view of a structure of a rotary valve sheet.

FIG. 8 schematically shows the two rotary valve sheets. The rotary valve sheet shown in FIG. 8a comprises: a rotary valve sheet body 6-2, a roller wheel 6-3, a roller pivot shaft 6-4, a roller sealing material 6-1, and a through hole 6-5 for mounting the rotary valve sheet supporting spindle. The rotary valve sheet shown in FIG. 8b comprises: a rotary valve sheet body 6-2 in which a through hole 6-9 for mounting the rotary valve sheet supporting spindle is formed, and a roller 6-7 mounted at a head of the rotary valve sheet body 6-2. Material of the roller wheel is selected according to working environmental conditions. Generally, abrasion-proof lubricant composite engineering plastic may be selected, or the roller wheel also may be made of the abrasion-proof lubricant alloy.

The power source is pressurized liquid or pressurized gas in the second embodiment.

Figure 9:
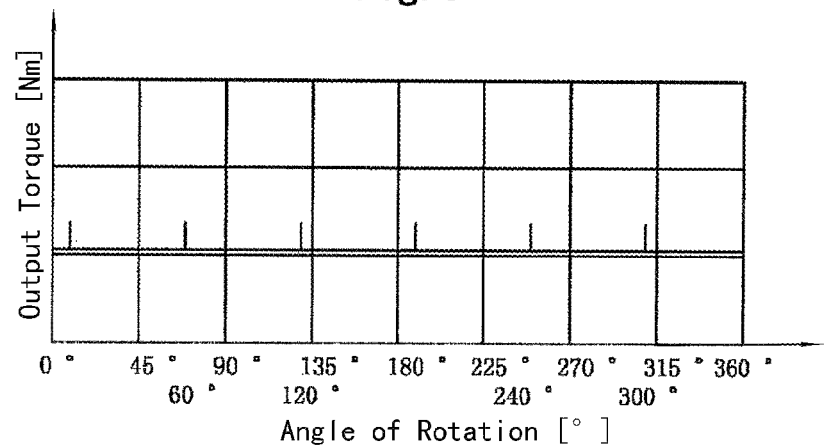
FIG. 9 is a schematic diagram of a stable output torque characteristic curve of the fluid motor of the present invention.

The pressurized liquid may be liquid, such as hydraulic oil and pressurized water, which is generated by a force pump. When the pressurized liquid is used, the pressurized liquid may be injected directly from the power source input opening so as to push the planetary piston wheel to rotate. As shown in FIG. 9, a stable output torque characteristic curve of the fluid motor is an ideal straight line. In a range of 360, the three annular hydraulic cylinders separated from each other by 120 degrees alternately operate and switches six times, and a small force increasing pulse occurs in the output torque at intervals of 60 degrees.

Figure 10:
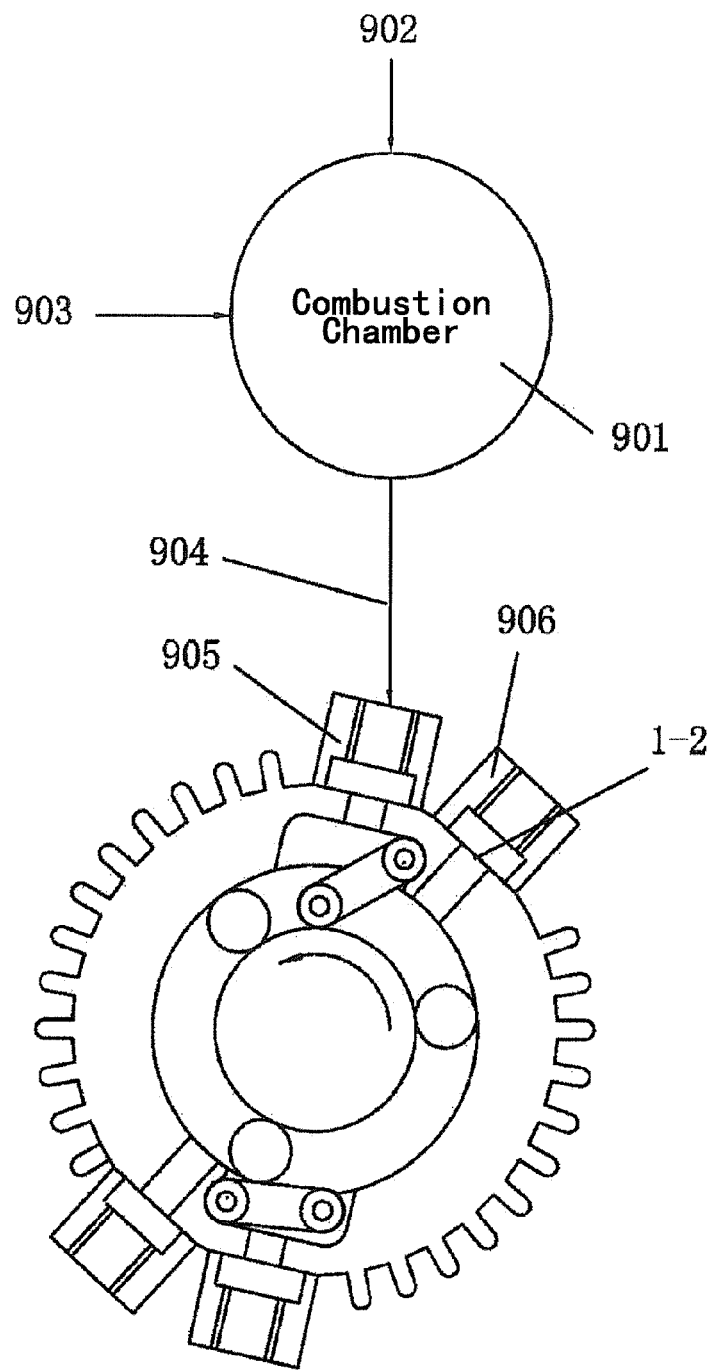
FIG. 10 is a schematic diagram showing principles of a gas air-cooled rotor engine of the present invention.

The pressurized gas may be pressurized gas generated by a gas pump, or gas generated by burning fuel such as gasoline or natural gas. FIG. 10 is a schematic diagram showing principles and a structure of a planetary piston wheel rotary valve sheet (abbreviated to planetary rotary type) rotor engine. A combustion chamber 901 is disposed outside the planetary rotary type pneumatic motor. Fuel such as gasoline or natural gas is injected into the combustion chamber 901 from an inlet 902 and is mixed with air injected into the combustion chamber from an air inlet 903 to burn. Generated high temperature and high pressure fluid enters the cylinder of the planetary rotary type rotor engine from an inlet 904 and is discharged from an exhaust gas discharge opening 1-2 after expanding. A gas inlet intensive block 905 and a gas discharge intensive block 906 are mounted on the cylinder block (stator) 1 with fins. The fuel and air are mixed in the combustion chamber 901, and continuously burned so that the planetary rotary type rotor engine is driven to rotate at a high speed by continuously flowing gas. The planetary rotary type rotor engine is an internal combustion motive power machine for converting energy of the fuel into useful work, and is a new planetary rotary type rotor heat engine.

Like operational process of a gas turbine, an air compressor continuously sucks air through a filter from the atmosphere and compresses air by using prior art. The compressed air is pumped into the combustion chamber and is mixed with injected fuel. The compressed air and the fuel are burned to become high temperature burned gas. The burned gas immediately flows into the planetary rotary type rotor engine. In this case, the planetary rotary type rotor engine is equivalent to a pneumatic motor for outputting power. Since an initial temperature of the burned gas reaches about 1200° C. at most, not only the combustion chamber should be made of high temperature resistant material such as nickel-base alloys and cobalt-base alloy, but also relevant material of the planetary rotary type rotor engine itself should be heat-resistant material.

Figure 11:
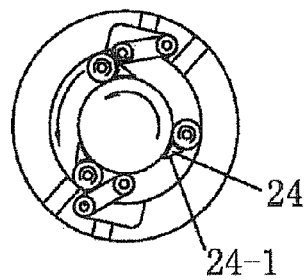
FIG. 11 is a schematic diagram showing buffer action of the rotary valve sheet after a rotary valve sheet buffer terrace is added in the present invention.

In order that the rotary valve sheet smoothly falls onto the center sun wheel drum after pushing the planetary piston wheel, referring to FIG. 11, a rotary valve sheet buffer terrace 24 is disposed to snug against the planetary piston wheel on a reverse surface of the planetary piston wheel in a movement direction of the planetary piston wheel. When the rotary valve sheet swings towards the center sun wheel drum, it is brought to be out of contact with the planetary piston wheel, moves towards the rotary valve sheet buffer terrace to release the pushing force, and smoothly lands on the surface of the center sun wheel drum. Therefore, the rotary valve sheet buffer terrace is a rod-shaped block having an oblique surface 24-1. The rotary valve sheet buffer terrace is fixed to the planetary piston wheel fixation flanges. Alternatively, rotary valve sheet buffer terraces are disposed to snug against the planetary piston wheel forward of the planetary piston wheel and rearward of the planetary piston wheel, the rotary valve sheet buffer terraces are fixed to the planetary piston wheel fixation flanges, and the rotary valve sheet buffer terrace is a circular rod or a rod having an oblique surface.

Embodiment 3

Figure 12:
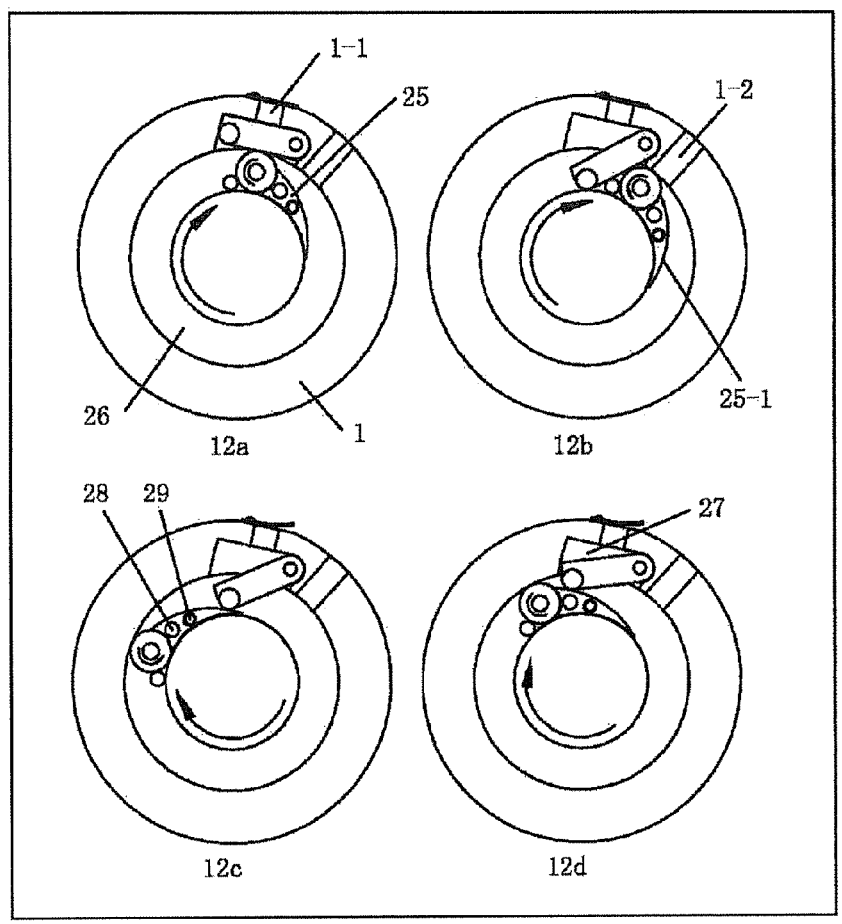
FIG. 12 is a schematic diagram showing a basic action principle and a structure of a single-planet type planetary piston wheel rotary valve sheet compressor.
Figure 13:
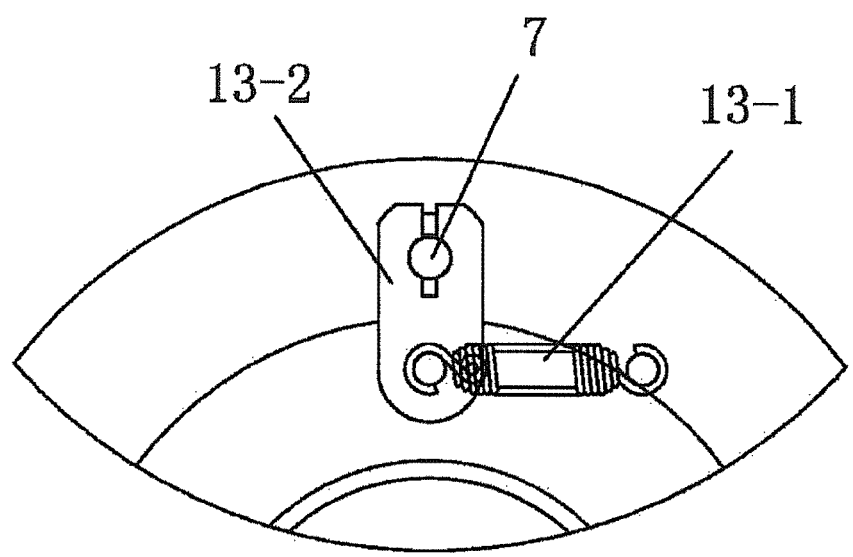
FIG. 13 is a schematic diagram of a structure in which a head of the rotary valve sheet is rotated to be snugged against a surface of a center sun wheel drum by means of a force of a spring.

Referring to FIGS. 2, 12, and 13, and the first and second embodiments, a planetary rotary type compressor and pump will be described as below. The planetary rotary type compressor and pump comprises a hollow cylinder block 1 having a cylinder, and a main shaft 3 supported by end covers 2 on both sides of the cylinder block. Sealing is performed between the cylinder block and the end covers. A planetary wheel rotation device is disposed around the main shaft to be driven to rotate by the main shaft. A groove 5 is disposed in a surface of the cylinder of the cylinder block in an axial direction of the cylinder. A rotary valve sheet 6 is mounted in the groove. A tail end of the rotary valve sheet is fixed in the groove by a rotary valve sheet shaft supporting spindle 7. The rotary valve sheet supporting spindle is disposed parallel to a center line of the cylinder of the cylinder block. An end surface of a head of the rotary valve sheet is a circular arc surface. The rotary valve sheet performs fan-shaped swing along a side of the groove with the rotary valve sheet supporting spindle serving as a center. During swing, the circular arc surface of the rotary valve sheet is in contact with the side of the groove. The planetary wheel rotation device comprises: a planetary piston wheel 8, planetary piston wheel fixation flanges 9, and a center sun wheel drum 10. The planetary piston wheel is a cylindrical roller. Both ends of the cylindrical roller are rotatably fixed to the planetary piston wheel fixation flanges. The planetary piston wheel fixation flanges are fixed to the main shaft through keys. The center sun wheel drum is fitted over the main shaft to be disposed between the planetary piston wheel and the main shaft. An annular piston space in which the planetary piston wheel rotates is formed between an outer circular surface of the center sun wheel drum and a cylinder wall of the cylinder of the cylinder block.

The third embodiment is different from the second embodiment in the following configurations. A through hole is disposed from a bottom surface of the groove to an outer surface of the cylinder block to serve as a pressure source output opening 1-1. A through hole from the surface of the cylinder of the cylinder block to the outer surface of the cylinder block is disposed in the cylinder block on a side of the rotary valve sheet supporting spindle to serve as a power source suction opening 1-2. In addition, a rotary valve sheet guide block 25 is disposed to snug against the cylindrical roller on a forward end of the cylindrical roller in a movement direction of the cylindrical roller. A rotary valve sheet resetting device is disposed between the rotary valve sheet and the cylinder block.

A number of the groove of the cylinder block is at least one, and a number of the planetary piston wheel is at least one. Referring to FIG. 12, FIG. 12 is a schematic diagram showing a basic action principle and a structure of a single-planet type planetary piston wheel rotary valve sheet (abbreviated to planetary rotary type) fluid compressor. The rotary valve sheet guide block 25 and the planetary piston wheel 8 shown in FIG. 12 rotate along with the planetary piston wheel fixation flanges 9 to become a rotor. The annular fluid space, which is surrounded by the inner circular surface of the cylinder block 1 as a stator and the outer circular surface of the center sun wheel drum 10, and the planetary piston wheel fixation flanges 9 on both sides, is a primary compression chamber 26. When the rotary valve sheet guide block 25 forcibly scoops up the gas discharge rotary valve sheet 6, the planetary piston wheel 8 further applies a pressure to fluid pressed in a secondary compression chamber (high pressure chamber) 27, by exerting a pressing force on the rotary valve sheet 6. The fluid breaks through an opening and closing valve sheet of the gas discharge opening to be discharged. Since a gas discharge pulse is sent out only once in the range of 360 degrees, a volumetric compression ratio of the cylinder is large and a gas discharge pressure is great. FIG. 12(*a*) is a schematic positional diagram in which the opening and closing valve sheet of the gas discharge opening closes, the gas discharge rotary valve sheet 8 completely swings to a bottom of the secondary compression chamber (high pressure chamber) 27, and the planetary piston wheel 8 passes the critical point; FIG. 12(*b*) is a schematic positional diagram in which the planetary piston wheel 8 has passed a switching region of the gas discharge rotary valve sheet 6 to begin to suck in gas; FIG. 12(*c*) is a schematic positional diagram in which discharge of gas is started after gas is primarily compressed by the planetary piston wheel 8; and FIG. 12(*d*) is a schematic positional diagram in which the planetary piston wheel 8 enters the switching region of the rotary valve sheet 6 to begin to discharge gas at a high pressure.

Alternatively the number of the grooves of the cylinder block is at least two according to design. The two grooves are disposed to be separated from each other by an angle of 180 degrees.

The number of the planetary piston wheels is at least three, and the three planetary piston wheels are disposed to be separated from each other by an angle of 120 degrees.

Referring to FIG. 12, the rotary valve sheet guide block 25 is a block having an oblique surface, and the oblique surface is a circular arc surface or a curve 25-1. A guide block supporting point rod 28 fixed to the planetary piston wheel holding discs serves as a positioning and supporting point for the gas discharge rotary valve sheet guide block 25. The subtle swing of the gas discharge rotary valve sheet guide block 25 which functions to perform sealing effect is constrained by a guide block position-limit rod 29. The guide block position-limit rod 29 is fitted with a hole of the gas discharge rotary valve sheet guide block 25 with a clearance between the guide block position-limit rod 29 and hole of the gas discharge rotary valve sheet guide block 25. When the rotor rotates at a high speed, the gas discharge rotary valve sheet guide block 25 swings outwards with the guide block supporting point rod 28 serving as a center, under the action of a centrifugal force.

However, the gas discharge rotary valve sheet guide block 25 is constrained by the guide block position-limit rod 29, it only offsets from the surface of the center sun wheel to the extent that frictionless contact therebeteween is achieved. When the head of the gas discharge rotary valve sheet has been pressed onto a head of the gas discharge rotary valve sheet guide block 25, the gas discharge rotary valve sheet guide block is pressed towards the surface of the center sun wheel to be brought into contact with the surface of the center sun wheel. The contact between the gas discharge rotary valve sheet guide block and the surface of the center sun wheel just performs a necessary seal function for preventing gas leakage. Since a relative speed between the gas discharge rotary valve sheet guide block and the surface of the center sun wheel is small, sliding wear is not large and can be automatically compensated.

The annular fluid space, which is surrounded by the inner circular surface of the cylinder block 1 as a stator and the outer circular surface of the center sun wheel, and the planetary piston wheel fixation flanges on both sides, serves as a primary compression chamber 26. When the wedge-shaped gas discharge rotary valve sheet guide block 25 forcibly scoops up the gas discharge rotary valve sheet, the planetary piston wheel further applies a pressure to fluid pressed in a secondary compression chamber (high pressure chamber) 27, by exerting a pressing force on the gas discharge rotary valve sheet. The fluid breaks through an opening and closing valve sheet of the gas discharge opening to be discharged. Since a gas discharge pulse is sent out only once in the range of 360 degrees, a volumetric compression ratio of the cylinder is large and a gas discharge pressure is great. FIG. 12(*a*) is a schematic positional diagram in which the opening and closing valve sheet of the gas discharge opening closes, the gas discharge rotary valve sheet completely swings to a bottom of the secondary compression chamber (high pressure chamber) 27, and the planetary piston wheel passes the critical point; FIG. 12(*b*) is a schematic positional diagram in which the planetary piston wheel has passed a switching region of the rotary valve sheet to begin to suck in gas; FIG. 12(*c*) is a schematic positional diagram in which discharge of gas is started after gas is primarily compressed by the planetary piston wheel; and FIG. 12(*d*) is a schematic positional diagram in which the planetary piston wheel enters the switching region of the rotary valve sheet to begin to discharge gas at a high pressure. As shown in FIG. 12, under the cam action of a circular arc curve 25-1 of the wedge-shaped gas discharge rotary valve sheet guide block 25, a rotational force applied to the gas discharge rotary valve sheet becomes larger and larger as the gas discharge rotary valve sheet swings back to the bottom of the secondary compression chamber (high pressure chamber).

Referring to FIG. 13, the rotary valve sheet resetting device is a tension spring 13-1, and one end of the tension spring is locked to the rotary valve sheet supporting spindle 7 by a crank 13-2, and another end of the tension spring is fixed to the cylinder block.

Embodiment 4

Figure 14:
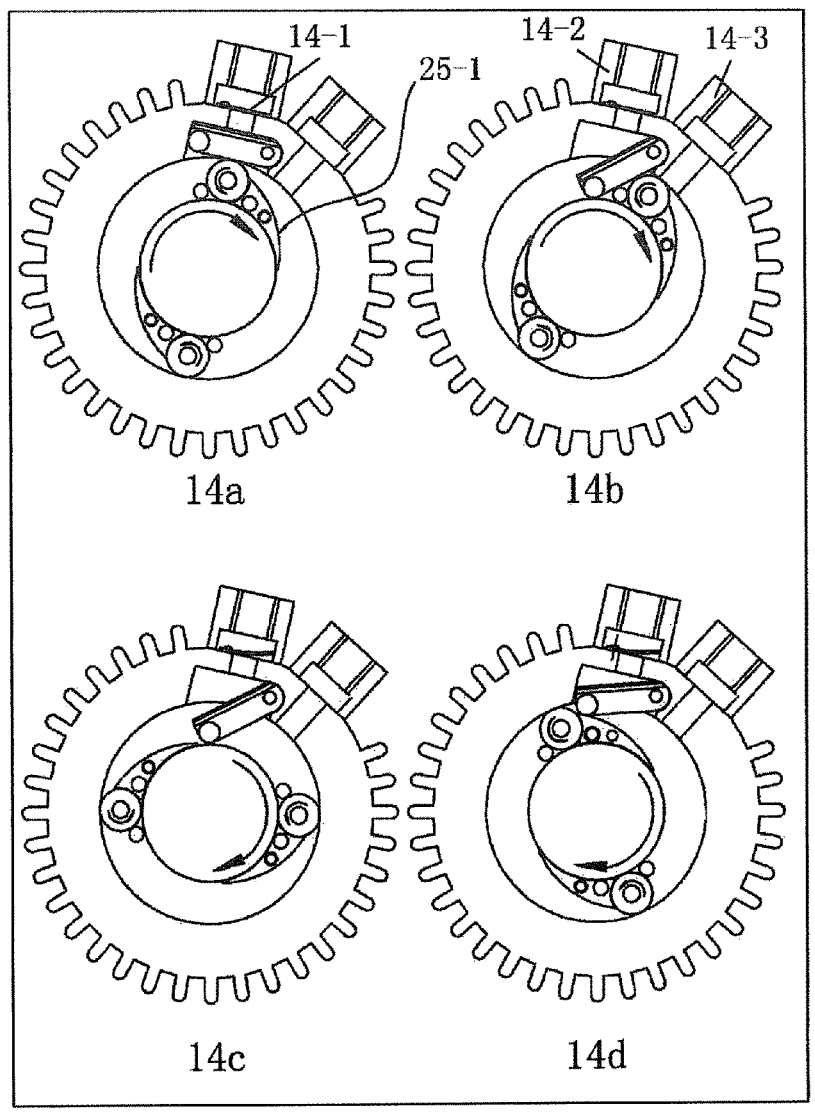
FIG. 14 is a schematic diagram showing a basic action principle of a double-planet planetary rotary type fluid compressor and a structure of a stator with a gas suction intensive block, a gas discharge intensive block, and fins.

The fourth embodiment is another embodiment of the planetary rotary type compressor and pump. Referring to FIG. 3, the number of the groove of the cylinder block is at least one, and the number of the planetary piston wheels is two. Referring to FIG. 14, a double-planet planetary rotary type fluid compressor has two planetary piston wheels to operate. The two planetary piston wheels are symmetrically disposed to be separated from each other by 180 degrees so as to conform to principles of precision machine technology. No eccentric vibration occurs in the compressor in operation. Since a gas discharge pulse is sent out twice in the range of 360 degrees, a volumetric compression ratio of the cylinder is only half of that of the single-planet compressor, and a gas discharge pressure is lower. FIG. 14*a* is a schematic positional diagram in which a check valve 14-1 of the gas discharge opening closes, the gas discharge rotary valve sheet completely swings to a bottom of the secondary compression chamber (high pressure chamber), and the planetary piston wheel passes the critical point; FIG. 14*b* is a schematic positional diagram in which the planetary piston wheel has passed a switching region of the gas discharge rotary valve sheet to begin to suck in gas, and the other opposite planetary piston wheel begins to compress gas; FIG. 14*c* is a schematic positional diagram in which discharge of gas is started after gas is primarily compressed by the planetary piston wheel; and FIG. 14*d* is a schematic positional diagram in which the planetary piston wheel enters the switching region of the gas discharge rotary valve sheet to begin to discharge gas at a high pressure. The cylinder of the double-planet planetary rotary type fluid compressor may be made as a stator with fins. The fluid compressor further comprises a gas discharge intensive block 14-2 and a gas suction intensive block 14-3 besides the gas discharge rotary valve sheet guide block and the gas discharge check valve 14-1. A circular arc guide curve or other appreciate curve that is easy to manufacture is adopted for a curve 25-1 of the gas discharge rotary valve sheet guide block, thereby ensuring that a pressure angle uniformly reduces with ascent of the roller wheel of the gas discharge rotary valve sheet.

Figure 15:
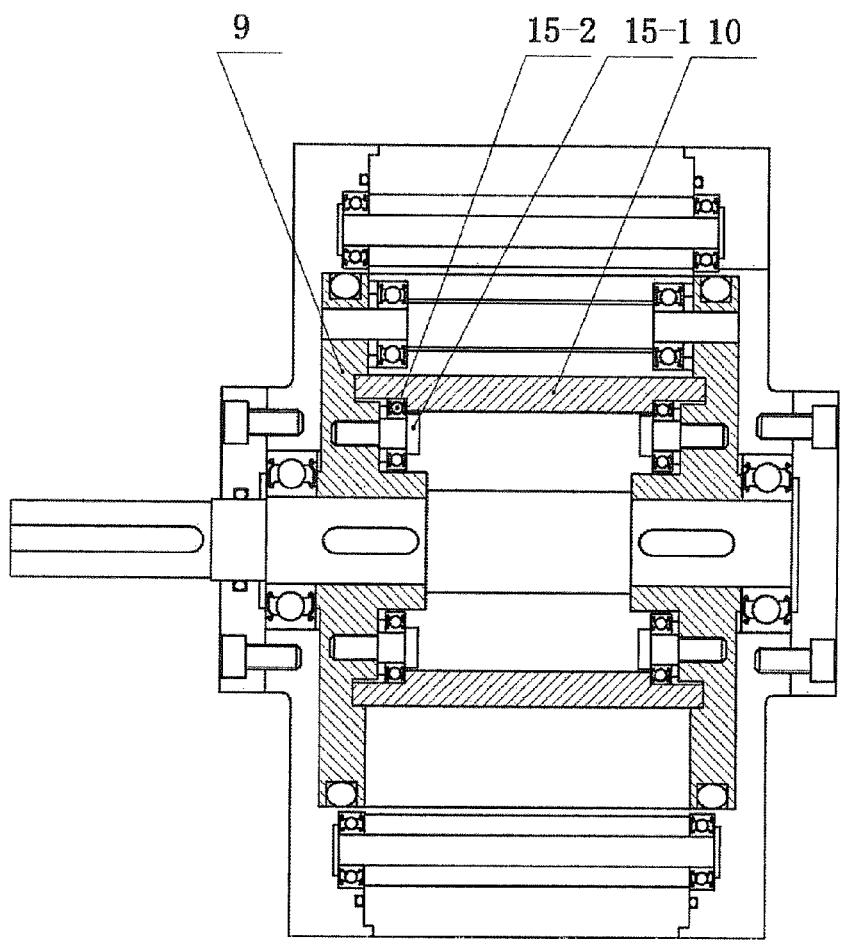
FIG. 15 is a schematic sectional side view of a structure of a large planetary rotary type hydraulic motor in which a plurality of rolling bearings are fixed to planetary piston wheel fixation flanges to be arranged symmetrically in a circular shape, thereby supporting a center sun wheel drum.

In the above embodiment, the bearings of the center sun wheel drum also may not be used in a particular situation such as a situation where a mounting space is especially large or insufficient. Referring to FIG. 15, a bearing fixation pin 15-1 is fastened to the planetary piston wheel fixation flange 9. Small rolling bearings 15-2 arranged along a circumference support the center sun wheel drum 10.

Figure 16:
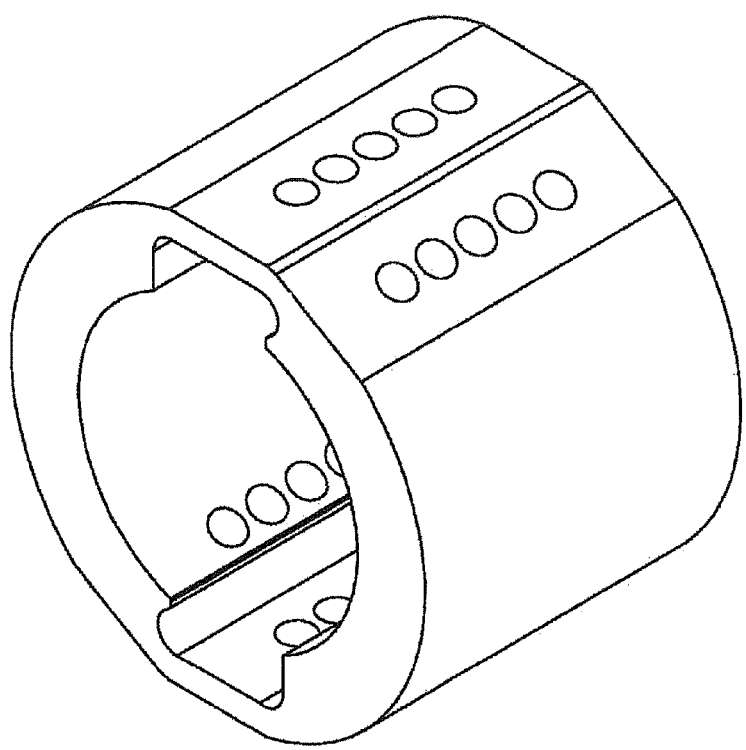
FIG. 16 is a schematic perspective view of a structure of a cylinder block.

Referring to FIG. 16, there are strict requirements for an angular phase for positional arrangement of the gas (liquid) inlet or the gas (liquid) discharge opening of the stator cylinder block in the second embodiment. The diameters of the bores generally cannot be arbitrarily increased. In order to enlarge a cross-sectional area of fluid flow, it will suffice that a plurality of small holes may be formed in the cylinder block, and are connected together by means of a piping. This is important for fluid machinery which needs a high speed and a large flow rate.

Figure 17:
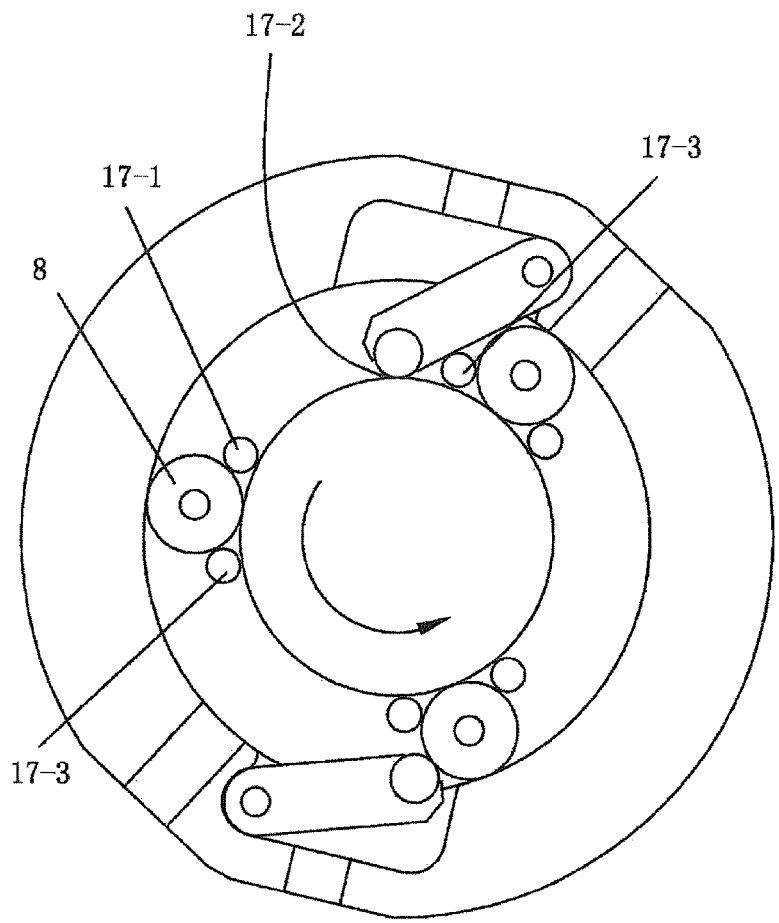
FIG. 17 is a schematic diagram showing action of the rotary valve sheet buffer terrace which is a buffer rod.

Referring to FIG. 17, rotary valve sheet buffer terraces are disposed to snug against the planetary piston wheel in the second embodiment forward of the planetary piston wheel and rearward of the planetary piston wheel, and the rotary valve sheet buffer terrace is a circular rod 17-1. The forward circular rod 17-3 of the rotary valve sheet buffer terraces is a force exerting rod of the rotary valve sheet buffer terrace, and the circular rod is fixed to the planetary piston wheel fixation flanges. The rearward buffer rod functions as the rotary valve sheet buffer terrace. When the planetary piston wheel 8 enters a critical position where the planetary piston wheel 8 is to butt away the rotary valve sheet, the planetary piston wheel 8 is at a distance from the rotary valve sheet. At this time, the frontward circular rod 17-3 of the rotary valve sheet buffer terrace as a butting-point force-exerting rod butts against a position of the rotary valve sheet which is close to the head. A moment arm for butting away the rotary valve sheet is about one time larger than when the rotary valve sheet is butted away originally directly by means of the planetary piston wheel. The reference numeral 17-2 shown in the figure indicates a point of tangency of the head roller wheel of the rotary valve sheet and the center sun wheel drum. A line connecting the point of tangency and a center point of the center sun wheel drum is used as a design reference line of geometry of the present invention.

Figure 18:
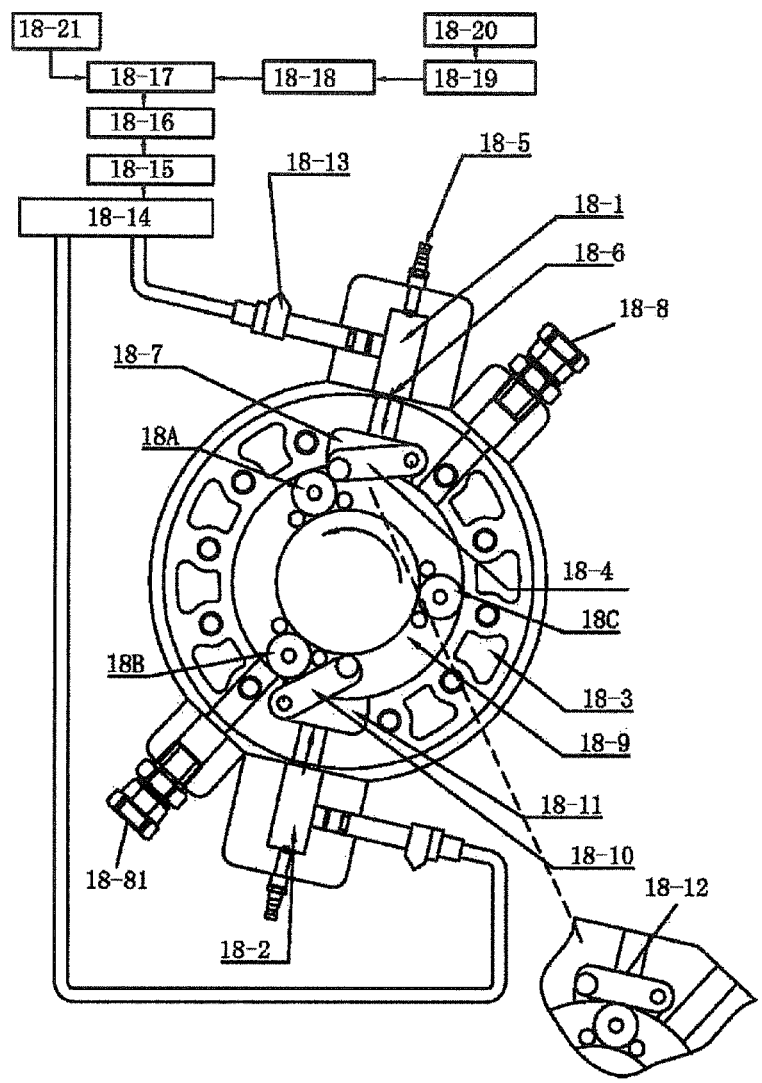
FIG. 18 is a schematic diagram showing principles and a structure of an ignition water-cooled rotor engine of the present invention.

Referring to FIG. 18, FIG. 18 schematically shows an engine. In FIG. 18, both an upper combustion chamber 18-1 and a lower combustion chamber 18-2 of an ignition planetary piston wheel rotary valve sheet (abbreviated to planetary rotary type) water-cooled rotor engine are integrally connected to a water-cooled cylinder block 18-3 of the planetary rotary type pneumatic motor. When the planetary piston wheel structure and the planetary piston wheel 18A are in a critical position, an ignition occasion is controlled by the upper rotary valve sheet 18-4 having a position annunciator (a sensor switch). An electric plug 18-5 performs ignition. Generated high pressure burned gas flow 18-6 rushes into an upper rotary valve sheet working chamber 18-7, and pushes the planetary piston wheel 18A to advance. Exhaust gas is discharged from a lower exhaust gas discharge opening 18-81. When the planetary piston wheel 18A is in the critical position, the burned gas of a previous stroke has completed a task that the pressure is consumed to do work, in a lower gas expansion space 18-9. Only after the planetary piston wheel 18C which has finished operation of one stroke at this time rotates forwards to an upper exhaust gas discharge opening 18-8, the exhaust gas can be discharged. When the planetary piston wheel 18A is in the critical position, the planetary piston wheel 18B is being in front of the lower rotary valve sheet 18-10 having a position annunciator (a sensor switch). As the electric plug 18-15 carries out ignition, the planetary piston wheel 18A advances, and finally the planetary piston wheel 18B presses the lower rotary valve sheet 18-10 having the position annunciator (the sensor switch) completely back into a lower rotary valve sheet working chamber 18-11. The engine is in a state where the lower combustion chamber 18-2 is ready for ignition. Each planetary piston wheel passes the critical position of a swing region of the rotary valve sheet twice each time the main shaft of the engine rotates by 360 degrees. Each time the main shaft of the engine rotates by 360 degrees, the upper combustion chamber 18-1 and the lower combustion chamber 18-2 alternately ignite for six times, and ignite once at intervals of 60 degrees to directly drive the main shaft to rotate. Each of the upper rotary valve sheet and the lower rotary valve sheet swings three times each time the main shaft rotates by 360 degrees. Since the swinging angle is very small, the rotational speed of the rotary valve sheet is about two thirds of a rotational speed of the main shaft. The heads of the upper and lower rotary valve sheets of the planetary rotary type rotor engine which have the position annunciators (the sensor switches), and the rotary valve sheet working chambers of the planetary rotary type rotor engine are respectively sealed so that they will not leak fuel before the plug performs ignition. In FIG. 18, on an occasion when the rotary valve sheet is completely locked 18-12, the occasion of fuel injection is controlled by the upper rotary valve sheet having the position annunciator.

In FIG. 18, a commercially available high pressure direct-injection combustion system is adopted. A high pressure oil injection valve 18-13 is to mounted on the upper combustion chamber. The high pressure oil injection valve 18-13 injects high pressure mixed oil and gas from a high pressure oil rail 18-14 into the upper combustion chamber when the upper rotary valve sheet 18-4 having the position annunciator enters the occasion that the rotary valve sheet is completely locked 18-12. A part connected to the high pressure oil rail 18-14 is a commercially available oil and gas supply device. The oil and gas supply device comprises a high pressure pump 18-15, a low pressure pump 18-16, a carburetor 18-17, a throttle 18-18, an air suction pump 18-19, an air filter 18-20, and an oil tank 18-21.

This is a motive power machine that does work by using detonation gas. A water-cooled system, a lubrication system, and an electric control system, and even seal gasket, manufacturing material and the like of the cylinder may be flexibly developed by using commercially available resource.

Figure 19:
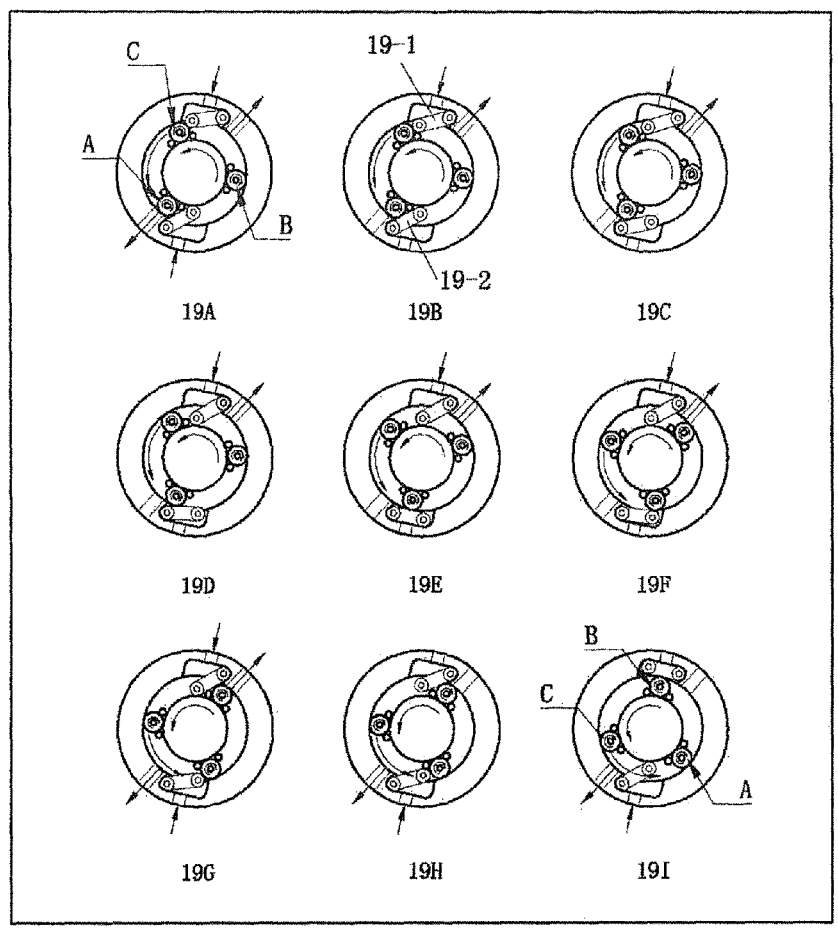
FIG. 19 is an illustrative diagram of operational principles and a structure of a hydro-penumatic fluid motor of the present invention.

Referring to FIG. 19, FIG. 19 schematically shows operational principles and a structure of a planetary piston wheel rotary valve sheet (abbreviated to planetary rotary type) hydro-penumatic fluid motor of the present invention. In nine FIGS. 19A, 19B, 19C, 19D, 19E, 19F, 19G, 19H, and 19I included in FIG. 19, all of the action processes of the three planetary piston wheels A, B and C when the wheel A passes the swing critical region of the lower rotary valve sheet 2 are decomposed and described one by one. The three planetary piston wheels A, B and C are fixed to the planetary piston wheel flanges connected to the main shaft through the keys.

In FIG. 19A, the piston wheel A is in the critical position in which the lower rotary valve sheet is opened. Combination of the upper rotary valve sheet of the fluid inlet and the piston wheel C functions to perform mechanical amplification based on the wedge principle, thereby pushing the piston wheel C to advance. At this time, the piston wheel B is in a last position of a working stroke of the piston wheel B, and it also crests for the motor main shaft to output a stable torque continuously. Both the piston wheel C and the piston wheel B operate to generate a pushing force. Fluid passes through both the fluid inlet and the fluid discharge opening.

In FIG. 19B, the lower rotary valve sheet has been opened by the butting-point force-exerting rod of the rotary valve sheet buffer terrace of the wheel A. Once the lower rotary valve sheet is opened, the two variable volume annular cylinders, which were divided by the lower rotary valve sheet, are connected together. The pushing force of the piston wheel B vanishes immediately, and the piston wheel C has been in a start position of a working stroke of the wheel C.

In FIG. 19C, the upper rotary valve sheet 19-1 has rotated and fallen onto the rotary valve sheet buffer rod, and the piston wheel C continues to advance under the action of the fluid pressure. The rotary valve sheet A continues to push away the lower rotary valve sheet 19-2, while the piston wheel B discharges waste liquid and exhaust gas from the fluid discharge opening.

In FIG. 19D, the upper rotary valve sheet 19-1 has rotated and fallen onto the center sun wheel drum. The piston wheel C continues to advance under the action of the fluid pressure, and the motor main shaft continuously outputs the stable torque.

In FIG. 19E, the lower rotary valve sheet 19-2 has completely returned. In other words, the lower rotary valve sheet 19-2 has completely returned into the rotary valve sheet groove of the inner wall of the cylinder block. At this time, the piston wheel A is in a just center position of the lower rotary valve sheet 19-2. The piston wheel C continues to advance under the action of the fluid pressure, and the piston wheel B discharges waste liquid and exhaust gas from the fluid discharge opening.

In FIG. 19F, the lower rotary valve sheet 19-2 rotates towards the center sun wheel drum again. At this time, the piston wheel A has reached the head of the lower rotary valve sheet 19-2, the piston wheel C still continues to advance under the action of the fluid pressure, and the piston wheel B still discharges waste liquid and exhaust gas from the fluid discharge opening.

In FIG. 19G, the piston wheel B has entered a critical region in which the upper rotary valve sheet 19-1 is opened. Combination of the lower rotary valve sheet 2 of the fluid inlet and the piston wheel A functions to perform mechanical amplification based on the wedge principle, thereby pushing the piston wheel A to advance. At this time, the piston wheel C is in a last position of a working stroke of the piston wheel C, and it also crests for the motor main shaft to output a stable torque continuously. Both the piston wheel C and the piston wheel A operate to generate a pushing force. At this time, volumes of the 120 degree annular cylinders between the piston wheels A and B and between the piston wheels B and is C are constant. When fluid is liquid, no fluid enters and exits through the fluid discharge opening because of incompressibility of the liquid. However, if the fluid is gas, then the compressed gas between the piston wheels A and B will discharge exhaust gas by expansion with a residual pressure, when the piston wheel B passes the fluid discharge opening.

In FIG. 19H, the upper rotary valve sheet 19-1 has been butted away by the butting-point force-exerting rod of the wheel B. Once the upper rotary valve sheet is opened, the two variable volume annular cylinders which were divided by the upper rotary valve sheet are connected together. The pushing force of the piston wheel C vanishes immediately, and the lower rotary valve sheet 19-2 rotates and falls onto the buffer rod of the rotary valve sheet. At this time, the piston wheel A has been in a start position of a working stroke of the wheel A, and the piston wheel C discharges waste liquid and exhaust gas from the fluid discharge opening.

In FIG. 19I, the lower rotary valve sheet 19-2 has rotated and fallen onto the center sun wheel drum. The piston wheel A has completely moved across the critical swing region of the lower rotary valve sheet 19-2, and a space of the high pressure chamber continuously enlarges under the action of the pressurized fluid that enters from the fluid inlet, thereby pushing the piston wheel A to continue to advance. Waste liquid and exhaust gas are discharged from the fluid discharge opening by the piston wheel C. At this time, the upper rotary valve sheet 1 has completely returned. In other words, the upper rotary valve sheet 19-1 has completely returned into the rotary valve sheet groove of the inner wall of the cylinder block. The piston wheel B is in a just center position of the upper rotary valve sheet.

It can be known from FIG. 19 that in the one 360-degree rotation of the main shaft, the planetary piston wheels A, B, and C pass the upper and lower rotary valve sheets once and the sequence of the planetary piston wheels that generate the pushing force is as follows: BC→C→CA→A→AB→B→BC→C→CA→A→AB→B→BC, in which BC, CA, AB, BC, CA, and AB occur at intervals of 60 degrees at the moment when the rotary is valve sheet is opened. Therefore, although a short pulse peak appears at intervals of 60 degrees, the torque output of the main shaft is an ideal horizontal straight line on the whole. It also can be known from FIG. 19 that the planetary rotary type hydropenumatic fluid motor of the present invention does not have the so-called "dead point". It is only necessary to maintain a pressure flow at the fluid inlet, but there is no need to mount valves for controlling the occasions when fluid enters and exits, at the fluid inlet and outlet. The mechanism itself can automatically continuously operate.

In summary, a planetary rotary type rotation device is disclosed in the basic embodiments of the present invention. The planetary rotary type rotation device comprises a stator and a rotor. The device further comprises a center sun wheel drum. The stator includes a hollow cylinder block having a cylinder. The rotor includes a main shaft, planetary piston wheel fixation flanges, and a planetary piston wheel. The two planetary piston wheel fixation flanges are symmetrically fixed to the main shaft. The center sun wheel drum is disposed between the two planetary piston wheel fixation flanges and fitted over the main shaft. An annular piston space is formed between an outer circular surface of the center sun wheel drum and a cylinder wall of the cylinder of the cylinder block. The planetary piston wheel is a cylindrical roller, and the cylindrical roller is disposed in the annular piston space in a rolling manner. Both ends of a supporting shaft of the cylindrical roller are fixed to the planetary piston wheel fixation flanges and to the main shaft so that the cylindrical roller links with the main shaft. The following two aspects should be noted: 1) the cylindrical roller may be connected to the main shaft in other manners or by means of other members. For example, the cylindrical roller may be connected to the main shaft by means of other connection members besides the planetary piston wheel fixation flanges, or the cylindrical roller may be connected to the main shaft by means of connection members commonly used in the art such as a crankshaft. 2) "The cylindrical roller links with the main shaft" means that the main shaft is driven to rotate by the cylindrical roller when the cylindrical roller is used as a component of the fluid motor or the engine, or means the cylindrical roller is driven to rotate in the annular piston space by the main shaft when the cylindrical roller is used as a component of the compressor or pump. It should be appreciated by those skilled in the art according to their professional knowledge that the above device may be used as a special bearing that outputs a torque from a rolling element cage or a toy for children.

Alternatively the planetary rotary type rotation device also can simply achieve the function that kinetic energy or potential energy of fluid is utilized to do work. For example, the planetary rotary type rotation device may be used as fluid machinery such as open type waterwheel like the Francis water turbine and the Pelton impulse water turbine. In this case, the annular piston space can communicate with the fluid inlet/outlet through a first set of through holes, and can communicate with the fluid outlet/inlet through a second set of through holes. For this technical solution, the follow aspects should be noted.

(1) Both the first and second sets of through holes may be disposed in the cylinder block.

(2) The communication occasions of the first and second sets of through holes may be different from each other as described above in detail. In addition, the sentence "the annular piston space can communicate with the fluid inlet/outlet through a first set of through holes, and can communicate with the fluid outlet/inlet through a second set of through holes" means that the annular piston space may communicate with the fluid inlet/outlet through a first set of through holes, and may communicate with the fluid outlet/inlet through a second set of through holes, but does not means the annular piston space communicates with the fluid inlet/outlet through a first set of through holes and communicates with the fluid outlet/inlet through a second set of through holes, at any time. The sentence means that the annular piston space communicates with the fluid inlet/outlet through a first set of through holes and communicates with the fluid outlet/inlet through a second set of through holes, at a predetermined time; and the annular piston space does not communicate with the fluid inlet/outlet through a first set of through holes and does not communicate with the fluid outlet/inlet through a second set of through holes, at is the other time outside the predetermined time.

(3) In the above sentence, the through holes are connected in the following two manners. (i) The annular piston space can communicate with the fluid inlet through a first set of through holes, and can communicate with the fluid outlet through a second set of through holes; or (ii) the annular piston space can communicate with the fluid outlet through a first set of through holes, and can communicate with the fluid inlet through a second set of through holes. The above sentence is adopted mainly because the arrangements of the fluid inlet/outlet are different for different fluid machinery such as the engine and pump.

The above contents are reflected in the machinery such as the engine, fluid motor, compressor and pump described in the description and are well known by the those skilled in the art.

The planetary rotary type rotation device of the present invention may further comprise an isolation structure on the basis of the above embodiments. Specifically, in the planetary rotary type rotation device, the groove is disposed in the inner cylinder surface of the cylinder block and the groove communicates with the fluid inlet/outlet through a first set of through holes. A second set of through holes are directly disposed in the inner cylinder surface of the cylinder block and located adjacent to the groove. The isolation structure comprises the rotary valve sheet and the rotary valve sheet spindle. The rotary valve sheet supporting spindle is disposed at one end of the groove and located parallel to an axial center line of the main shaft. The rotary valve sheet is disposed in the groove. The rotary valve sheet swings between a closed position and an open position through the rotary valve sheet spindle which is parallel to an axial center line of the annular piston space. When the rotary valve sheet is in the closed position, a middle portion of a top end of the rotary valve sheet is pressed on the outer cylindrical surface of the center sun wheel drum to isolate the annular piston space into two variable volume working spaces. It shall be noted that the annular space is divided into two variable volume working chambers when the rotary valve sheet rotates into the annular space between the two planetary piston wheels. The rotary valve sheet swings periodically in such a way that a shaft fixed in the rotary valve sheet groove of the circular stator housing which is also used as the inner wall of the cylinder block serves as a supporting point. The planetary piston wheels sealed in the annular space can be driven to move by a difference between fluid pressures within the two working chambers. This is a basic point of the structure of the planetary rotary type fluid machinery of the present invention. Apparently, there is more than one method by means of which the annular piston space formed between the outer circular surface of the center sun wheel drum and the cylinder wall of the cylinder of the cylinder block is isolated into two variable volume working chambers. Besides the above embodiment in which isolation is carried out by a single swing rotary valve sheet, there also may be isolators having other shapes and structures, and there are various isolators just like gates through which everybody enters and exits such as a single door, double doors, a folding door, and an extendable door. The isolators for the annular space formed between the two planetary piston wheels may adopt various structures.

As a specific usage of the present invention, the present invention further seeks to protect an engine. The engine comprises the above planetary rotary type rotation device. The first set of through holes of the planetary rotary type rotation device communicate with a combustion chamber, and the second set of through holes of the planetary rotary type rotation device communicate with an exhaust gas discharge opening.

As a specific usage of the present invention, the present invention further seeks to protect a fluid motor. The fluid motor comprises the above planetary rotary type rotation device. The first set of through holes of the planetary rotary type rotation device communicate with a high pressure fluid inlet, and the second set of through holes of the planetary rotary type rotation device communicate with a low pressure fluid discharge opening.

As a specific usage of the present invention, the present invention further seeks to protect a compressor. The compressor comprises the above planetary rotary type rotation device. The first set of through holes of the planetary rotary type rotation device communicate with a high pressure fluid output opening, and the second set of through holes of the planetary rotary type rotation device communicate with a low pressure fluid inlet.

As a specific usage of the present invention, the present invention further seeks to protect a pump. The pump comprises the above planetary rotary type rotation device. The first set of through holes of the planetary rotary type rotation device communicate with a high pressure fluid output opening, and the second set of through holes of the planetary rotary type rotation device communicate with a low pressure fluid inlet.

Since the circular ring-shaped hydraulic (pneumatic) cylinder is adopted in the fluid machinery (the engine, fluid motor, compressor, and pump) of the present invention, an outer circumferential space of a machine is effectively utilized to the utmost extent, The machinery is large in a radius, an output torque, and a flow rate, and constant in an output power. In addition, the planetary rotary type fluid machinery may be applied in a situation of extra-low pressure fluid drive, such as low pressure drive using tap water, since the planetary rotary type rotation device has a low frictional resistance of mechanical movement because of the rolling friction configuration proper to the planetary rotary type rotation device.

It should be noted that elements in the drawings are not necessarily plotted to strict scale for simply and concisely showing the elements. In addition, the features and advantageous effects of the present invention are described in the embodiments. However, the structural and functional details of the present invention are described only for the purpose of disclosure and explanation of the present invention. It will be understood by those skilled in the art that various alterations in detail especially in the shapes, dimensions, arrangement of the components of the present invention may be made in the embodiments without departing from the principles and spirit of the present invention, the scope of which is defined in the appended claims.

The object, technical solutions, and advantageous effect of the present invention are further described in detail in the above specific embodiments. It should be appreciated that the above description is only specific embodiments of the present invention and the embodiment is not used to limit the present invention. It will be understood by those skilled in the art that various modifications, equivalent substitutions and improvements may be made therein without departing from the principles and spirit of the present invention and fall within the scope of the present invention.

The invention claimed is:

1. A planetary rotary device, comprising:
   a hollow cylinder block;
   a main shaft supported by cylinder block sealing end covers on both sides of the cylinder block;
   a center sun wheel drum rotatably fitted over the main shaft;
   an annular piston space formed by an outer circular cylindrical surface of the center sun wheel drum and an inner circular cylindrical surface of the cylinder block, wherein the annular piston space can communicate with a fluid inlet/outlet through a first set of through holes, and can communicate with a fluid outlet/inlet through a second set of through holes; and a planetary piston wheel disposed in the annular piston space in a rolling manner, wherein both ends of the planetary piston wheel that project out of the annular piston space are connected to the main shaft; and the planetary piston wheel is a circular cylindrical roller and is in contact with the outer circular cylindrical surface of the center sun wheel drum, the planetary piston wheel rolls against the inner circular cylindrical surface of the cylinder block and against the outer circular cylindrical surface of the center sun wheel drum, wherein the outer circular cylindrical surface of the center sun wheel drum and the inner circular cylindrical surface of the cylinder block are substantially coaxial, wherein the planetary rotary device further comprises an isolation structure, wherein the isolation structure comprises a rotary valve sheet and a rotary valve sheet spindle;

the isolation structure is located between the first set of through holes and the second set of through holes in the annular piston space for isolating the annular piston space into two variable volume working spaces; and the planetary piston wheel moves along an interior of the annular piston space under an action of a difference between fluid pressures of the two variable volume working spaces.

2. The planetary rotary device of claim 1, wherein, N≥1, where N is a number of the planetary piston wheels; and the N planetary piston wheels are uniformly disposed to be separated from each other by 360 degrees/N; and M≥1, each of a number of the first set of through holes and a number of the second set of through holes is M; and the first set of through holes are uniformly disposed to be separated from each other by 360 degrees/M, and the second set of through holes are uniformly disposed to be separated from each other by 360 degrees/M.

3. The planetary rotary device of claim 2, wherein N=3, and M=2.

4. The planetary rotary device of claim 1, wherein a groove is disposed in the inner circular cylindrical surface of the cylinder block, the first set of through holes are disposed in the groove, and the groove communicates with the fluid inlet/outlet through the first set of through holes; and the second set of through holes are disposed in the inner circular cylindrical surface of the cylinder block and located adjacent to the groove;

the rotary valve sheet spindle is disposed at an end of the groove and located parallel to an axial center line of the main shaft, and the rotary valve sheet is disposed in the groove; and the rotary valve sheet swings between a closed position and an open position through the rotary valve sheet spindle, when the rotary valve sheet is in the closed position, a middle portion of a top end of the rotary valve sheet is pressed on the outer cylindrical surface of the center sun wheel drum to isolate the annular piston space into the two variable volume working spaces.

5. The planetary rotary device of claim 1, wherein the isolation structure further comprises a sealing roller, the sealing roller is disposed at a head of the rotary valve sheet for reducing friction between the head of the rotary valve sheet and the center sun wheel drum.

6. An engine, wherein the engine comprises the planetary rotary device of claim 1, and wherein the first set of through holes of the planetary rotary device communicate with a combustion chamber, and the second set of through holes of the planetary rotary device communicate with an exhaust gas discharge opening.

7. A fluid motor, wherein the fluid motor comprises the planetary rotary device of claim 1, and wherein the first set of through holes of the planetary rotary device communicate with a high pressure fluid inlet, and the second set of through holes of the planetary rotary device communicate with a low pressure fluid discharge opening.

8. A compressor, wherein the compressor comprises the planetary rotary device of claim 1, and wherein the first set of through holes of the planetary rotary device communicate with a high pressure fluid output opening, and the second set of through holes of the planetary rotary device communicate with a low pressure fluid inlet.

9. A pump, wherein the pump comprises the planetary rotary device of claim 1, and wherein the first set of through holes of the planetary rotary device communicate with a high pressure fluid output opening, and the second set of through holes of the planetary rotary device communicate with a low pressure fluid inlet.

10. A planetary rotary device, comprising:
a stator including a hollow cylinder block;
a center sun wheel drum; and
a rotor, wherein the rotor includes a main shaft, planetary piston wheel fixation flanges, and a planetary piston wheel,
wherein the planetary piston wheel fixation flanges are symmetrically fixed to the main shaft, the center sun wheel drum is disposed between the planetary piston wheel fixation flanges and rotatably fitted over the main shaft, an annular piston space is formed between an outer circular cylindrical surface of the center sun wheel drum and an inner circular cylindrical surface of the cylinder block, the planetary piston wheel is a circular cylindrical roller and in contact with the outer circular cylindrical surface of the center sun wheel drum, and the cylindrical roller is disposed in the annular piston space in a rolling manner, and both ends of a supporting shaft of the cylindrical roller are fixed to the planetary piston wheel fixation flanges, the planetary piston wheel rolls against the inner circular cylindrical surface of the cylinder block and against the outer circular cylindrical surface of the center sun wheel drum, and
wherein the outer circular cylindrical surface of the center sun wheel drum and the inner circular cylindrical surface of the cylinder block are substantially coaxial.

11. A planetary rotary fluid motor or engine, comprising:
a hollow cylinder block;
a main shaft supported by end covers on both sides of the cylinder block;
a seal disposed between the cylinder block and the end covers;
a planetary wheel rotation device disposed around the main shaft to drive the main shaft to rotate, wherein the planetary wheel rotation device comprises: planetary piston wheels, planetary piston wheel fixation flanges, and a center sun wheel drum, the planetary piston wheel is a circular cylindrical roller and in contact with an outer circular cylindrical surface of the center sun wheel drum, and wherein both ends of the cylindrical roller are rotatably fixed to the planetary piston wheel fixation flanges;

a groove disposed in an inner circular cylindrical surface of the cylinder block in an axial direction of the cylinder block;

a rotary valve sheet mounted in the groove, wherein a tail end of the rotary valve sheet is fixed in the groove by a rotary valve sheet supporting spindle, the rotary valve sheet supporting spindle is disposed parallel to an axial center line of the cylinder block, and an end surface of a head of the rotary valve sheet is a circular arc surface;

a through hole extending from a bottom surface of the groove to an outer surface of the cylinder block to serve as a power source input opening; and a through hole extending from the inner circular cylindrical surface of the cylinder block to the outer surface of the cylinder block and disposed in the cylinder block to serve as a power source discharge opening; and a seal disposed between the planetary piston wheel fixation flange and the cylinder block, wherein the planetary piston wheel fixation flanges are fixed to the main shaft through keys, the center sun wheel drum is rotatably fitted over the main shaft to be disposed between the planetary piston wheels and the main shaft, an annular piston space in which the planetary piston wheels rotate is formed between the outer circular cylindrical surface of the center sun wheel drum and the inner circular cylindrical surface of the cylinder block, a number of the grooves of the cylinder block is at least two, and a number of the planetary piston wheels is at least three.

12. The planetary rotary fluid motor or engine of claim 11, wherein the planetary piston wheel is formed by rotatably fitting a roller barrel over a supporting shaft through a bearing, both ends of the supporting shaft are fixed to the planetary piston wheel fixation flanges, and the planetary piston wheel rolls snugly against the inner circular cylindrical surface of the cylinder block and against the outer circular cylindrical surface of the center sun wheel drum with both ends of the supporting shaft severing as supporting points.

13. The planetary rotary fluid motor or engine of claim 11, wherein the center sun wheel drum is fitted over the main shaft through a bearing.

14. The planetary rotary fluid motor or engine of claim 11, wherein both ends of the rotary valve sheet supporting spindle are fixed to the end covers.

15. The planetary rotary fluid motor or engine of claim 11, wherein the two grooves are disposed to be separated from each other by an angle of approximately 180 degrees, and the planetary piston wheels comprise three planetary piston wheels disposed to be separated from each other by an angle of approximately 120 degrees.

16. The planetary rotary fluid motor or engine of claim 11, wherein rotary valve sheet buffer terraces are disposed to snug against the planetary piston wheel forward of the planetary piston wheel and rearward of the planetary piston wheel, the rotary valve sheet buffer terraces are fixed to the planetary piston wheel fixation flanges, and the rotary valve sheet buffer terrace is a circular rod or a rod having an oblique surface.

17. A method of operating a planetary rotary fluid motor or engine comprising a hollow cylinder block; a main shaft supported by end covers on both sides of the cylinder block; a seal disposed between the cylinder block and the end covers; a planetary wheel rotation device disposed around the main shaft to drive the main shaft to rotate, wherein the planetary wheel rotation device comprises: planetary piston wheels, planetary piston wheel fixation flanges, and a center sun wheel drum, wherein the planetary piston wheel is a circular cylindrical roller and in contact with an outer circular cylindrical surface of the center sun wheel drum, and wherein both ends of the cylindrical roller are rotatably fixed to the planetary piston wheel fixation flanges; a groove disposed in an inner circular cylindrical surface of the cylinder block in an axial direction of the cylinder block; a rotary valve sheet mounted in the groove, wherein a tail end of the rotary valve sheet is fixed in the groove by a rotary valve sheet supporting spindle, the rotary valve sheet supporting spindle is disposed parallel to an axial center line of the cylinder block, and an end surface of a head of the rotary valve sheet is a circular arc surface; a through hole extending from a bottom surface of the groove to an outer surface of the cylinder block to serve as a power source input opening; and a through hole extending from the inner circular cylindrical surface of the cylinder block to the outer surface of the cylinder block and disposed in the cylinder block to serve as a power source discharge opening; and a seal disposed between the planetary piston wheel fixation flange and the cylinder block, wherein the planetary piston wheel fixation flanges are fixed to the main shaft through keys, the center sun wheel drum is rotatably fitted over the main shaft to be disposed between the planetary piston wheels and the main shaft, an annular piston space in which the planetary piston wheels rotate is formed between the outer circular cylindrical surface of the center sun wheel drum and the inner circular cylindrical surface of the cylinder block, a number of the grooves of the cylinder block is at least two, and a number of the planetary piston wheels is at least three, the method comprises:

injecting a pressurized gas or liquid from the power source input opening of the cylinder block into the groove of the cylinder block; driving, by the gas or liquid, the rotary valve sheet to perform a downward fan-shaped swing along a side of the groove with the rotary valve sheet supporting spindle serving as a center; pushing the planetary piston wheel to rotate forwards by the head of the rotary valve sheet, and then rushing the pressurized gas or liquid into the annular piston space to continue to push the planetary piston wheel to rotate forwards along the annular piston space; pressing the gas or liquid to be discharged from the power source discharge opening by the planetary piston wheel rotating forwards, and forming a gas or liquid pressure difference between the adjacent piston spaces separated by the rotary valve sheet after the rotary valve sheet swings downwards to the center sun wheel drum; and pressing the rotary valve sheet to swing upwards by the planetary piston wheel during the forward rotation of the planetary piston wheel, to reset the rotary valve sheet so that the rotary valve sheet enters a next reciprocating period.

18. A planetary rotary compressor or pump, comprising:
a hollow cylinder block;
a main shaft supported by end covers on both sides of the cylinder block;
a seal disposed between the cylinder block and the end covers;
a planetary wheel rotation device disposed around the main shaft to be driven to rotate by the main shaft, wherein the planetary wheel rotation device comprises: a planetary piston wheel, planetary piston wheel fixation flanges, and a center sun wheel drum, the planetary piston wheel is a circular cylindrical roller, and wherein both ends of the cylindrical roller are rotatably fixed to the planetary piston wheel fixation flanges;

a groove disposed in an inner circular cylindrical surface of the cylinder block in an axial direction of the cylinder block;

a rotary valve sheet mounted in the groove, a tail end of the rotary valve sheet is fixed in the groove by a rotary valve sheet supporting spindle, the rotary valve sheet supporting spindle is disposed parallel to an axial center line of the cylinder block, and an end surface of a head of the rotary valve sheet is a circular arc surface;

a through hole extending from a bottom surface of the groove to an outer surface of the cylinder block to serve as a pressure source output opening;

a through hole extending from the inner circular cylindrical surface of the cylinder block to the outer surface of the cylinder block and disposed in the cylinder block to serve as a fluid input;

a rotary valve sheet guide block disposed to snug against the cylindrical roller on a forward end of the cylindrical roller in a movement direction of the cylindrical roller; and a tension spring disposed between the rotary valve sheet and the cylinder block, wherein the planetary piston wheel fixation flanges are fixed to the main shaft through keys, the center sun wheel drum is fitted over the main shaft to be disposed between the planetary piston wheel and the main shaft, and an annular piston space in which the planetary piston wheel rotates is formed between an outer circular cylindrical surface of the center sun wheel drum and the inner circular cylindrical surface of the cylinder block.

19. The planetary rotary compressor or pump of claim 18, wherein the rotary valve sheet guide block is a block having an oblique surface, the oblique surface is a circular arc surface or a curve, and the rotary valve sheet guide block is supported and positioned by two spindles fixed to the planetary piston wheel fixation flanges.

20. The planetary rotary compressor or pump of claim 18, wherein one end of the tension spring is locked to the rotary valve sheet supporting spindle by a crank, and another end of the tension spring is fixed to the cylinder block.

* * * * *